US009858599B2

(12) United States Patent
Takeda

(10) Patent No.: US 9,858,599 B2
(45) Date of Patent: Jan. 2, 2018

(54) COMMUNICATION SYSTEM

(71) Applicant: Kikuo Takeda, Tokyo (JP)

(72) Inventor: Kikuo Takeda, Tokyo (JP)

(73) Assignee: Kikuo TAKEDA, Tokyo (JP)

( * ) Notice: Subject to any disclaimer, the term of this patent is extended or adjusted under 35 U.S.C. 154(b) by 102 days.

(21) Appl. No.: 14/007,905

(22) PCT Filed: Feb. 15, 2013

(86) PCT No.: PCT/JP2013/053726
§ 371 (c)(1),
(2) Date: Sep. 26, 2013

(87) PCT Pub. No.: WO2014/027471
PCT Pub. Date: Feb. 20, 2014

(65) Prior Publication Data
US 2014/0207577 A1    Jul. 24, 2014

(30) Foreign Application Priority Data

Aug. 17, 2012 (JP) .................................. 2012-181093

(51) Int. Cl.
G06Q 30/00 (2012.01)
G06Q 30/02 (2012.01)
(Continued)

(52) U.S. Cl.
CPC .... *G06Q 30/0267* (2013.01); *H04M 3/42195* (2013.01); *H04M 3/53308* (2013.01);
(Continued)

(58) Field of Classification Search
CPC ............................................... G06Q 30/0267
(Continued)

(56) References Cited

U.S. PATENT DOCUMENTS 8,412,578 B2 * 4/2013 Roberts ...................... 705/14.66
8,539,362 B2 * 9/2013 Patel et al. ................... 715/752
(Continued)

FOREIGN PATENT DOCUMENTS

CN     101106825 A    1/2008
JP     2002-051159 A  2/2002
(Continued)

OTHER PUBLICATIONS

International Search Report dated Apr. 9, 2013, issued in corresponding application No. PCT/JP2013/053726 with English translation (7 pages).
(Continued)

*Primary Examiner* — Alvin L Brown
(74) *Attorney, Agent, or Firm* — Westerman, Hattori, Daniels & Adrian

(57) ABSTRACT

A communication system includes a call answering center; a first mobile phone that registers a call answering setting in the call answering center; a second mobile phone that makes a call to the first mobile phone and includes a display unit and an operation unit; and a telephone communication network that connects the first mobile phone, the second mobile phone, and the call answering center in a communicable manner. When a call is made and the call answering setting is performed, the call answering center composes a call answering message accompanied by a reply program having an advertisement image attached thereto in accordance with the call answering setting, and transmits the call answering message to the second mobile phone. Upon receiving the call answering message, the second mobile phone causes the display unit to display an image of the reply program having the advertisement image superimposed thereon.

14 Claims, 23 Drawing Sheets

(51) Int. Cl.
*H04W 4/12* (2009.01)
*H04M 3/533* (2006.01)
*H04M 3/42* (2006.01)
H04M 1/725 (2006.01)
H04M 3/487 (2006.01)
H04M 7/00 (2006.01)

(52) U.S. Cl.
CPC ......... *H04M 3/53341* (2013.01); *H04W 4/12* (2013.01); *H04M 1/72519* (2013.01); *H04M 3/4878* (2013.01); *H04M 7/0054* (2013.01); *H04M 2203/651* (2013.01)

(58) Field of Classification Search
USPC ........................................................ 705/14.64
See application file for complete search history.

(56) References Cited

U.S. PATENT DOCUMENTS

| | | | |
|---|---|---|---|
| 2003/0138087 | A1 | 7/2003 | Takeda et al. |
| 2006/0041470 | A1* | 2/2006 | Filho et al. ............... 705/14 |
| 2008/0215436 | A1 | 9/2008 | Roberts |
| 2009/0037276 | A1* | 2/2009 | Smith ........................ 705/14 |
| 2010/0278319 | A1* | 11/2010 | Wang ................... H04L 12/589 |
| | | | 379/88.11 |
| 2011/0028133 | A1 | 2/2011 | Roach, Jr. |
| 2011/0270685 | A1* | 11/2011 | Marks et al. ............ 705/14.66 |

FOREIGN PATENT DOCUMENTS

| | | |
|---|---|---|
| JP | 2003-051884 A | 2/2003 |
| JP | 2005-260417 A | 9/2005 |
| JP | 2010-130379 A | 6/2010 |
| JP | 2010-146274 A | 7/2010 |
| WO | 02/063859 A1 | 8/2002 |
| WO | 2011/021077 A1 | 2/2011 |

OTHER PUBLICATIONS

Written Opinion dated Apr. 9, 2013, issued in corresponding application No. PCT/JP2013/053726 with English translation (7 pages).
International Search Report dated Apr. 9, 2013, issued in corresponding application No. PCT/JP2013/053726.
Written Opinion dated Apr. 9, 2013, issued in corresponding application No. PCT/JP2013/053726.
Extended (supplementary) European Search Report dated May 13, 2016, issued in counterpart European Patent Application No. 13879459.9. (7 pages).
Office Action dated Apr. 20, 2016, issued in counterpart Chinese Patent Application No. 201380040055.9. (13 pages).
flice Action dated Mar. 20, 2017, issued in counterpart Chinese Patent Application No. 201380040055.9, with English translation. (26 pages).

* cited by examiner

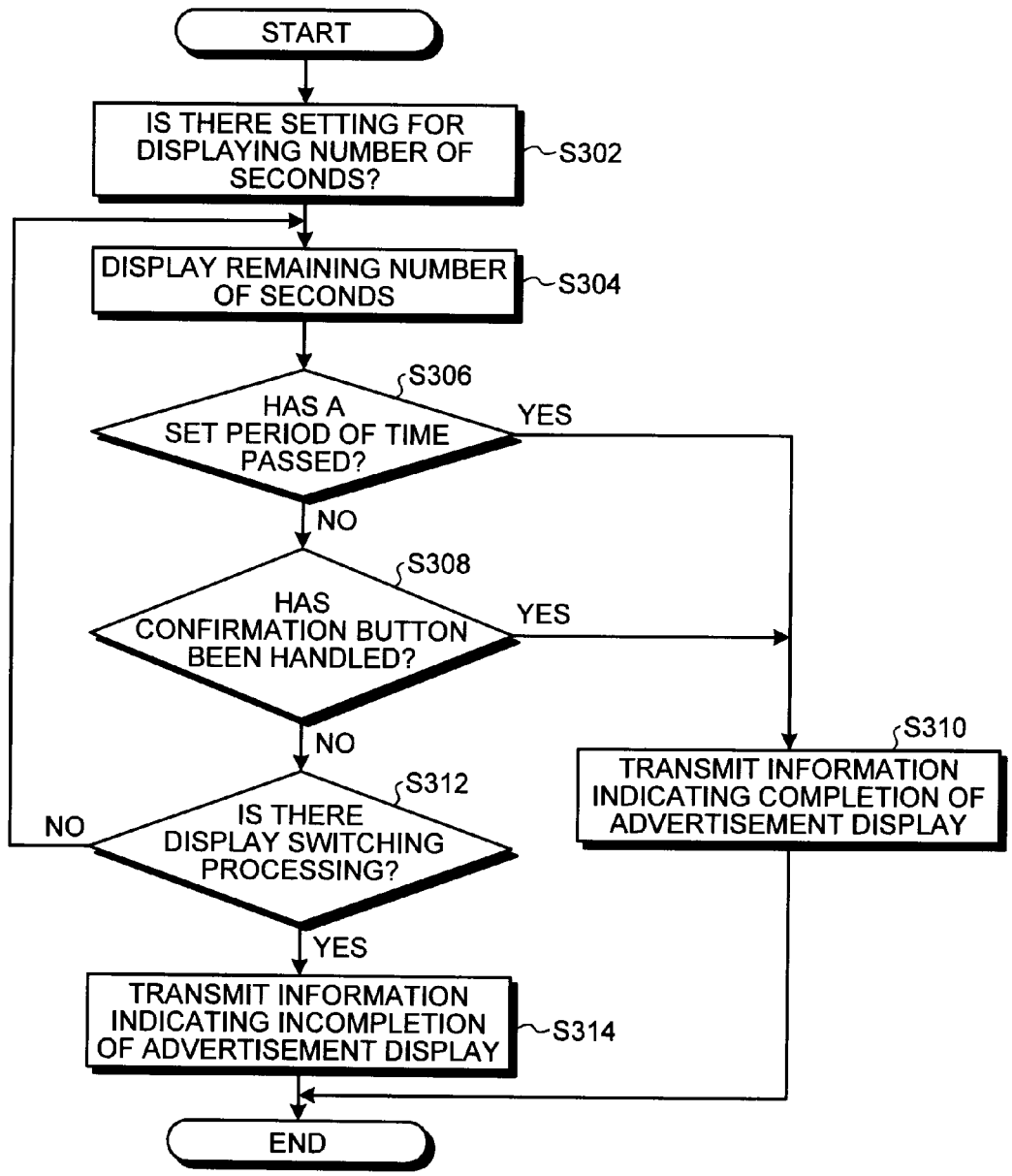

COMMUNICATION SYSTEM

FIELD

The present invention relates to a communication system including mobile phones.

BACKGROUND

Mobile phones have various kinds of functions, and some of them have a so-called call answering function that allows a caller to leave a message when a call cannot be answered (see Patent Literatures 1 through 3).

Patent Literature 1 discloses a telephone device that, in an answering machine mode, issues an instruction to notify the terminal on the other end of a call from the terminal on the other end, and writes selected data into a received call storage unit when receiving the data selected by the terminal on the other end. In a normal mode, the telephone device instructs a display unit to display an answering message from the terminal on the other end when receiving a notification that the terminal on the other end is in an answering machine mode, and, issues an instruction to send an answering message selected based on the display on the display unit, to the terminal on the other end.

Patent Literature 2 discloses a call answering method including: the step of storing, into a storage medium, answering messages in voices of celebrities whose voices are valued; and the step of generating billing information for each voice selected from the voices.

As for a call answering service function, a system is disclosed in Patent Literature 3, which is a patent application filed by the applicant. In the answering and guiding system for unanswered calls disclosed in Patent Literature 3, when the mobile phone on the receiving end cannot answer a call, the mobile phone on the receiving end automatically identifies the caller to be notified of the unavailability on the receiving end, in accordance with conditions for notification. A notifying means notifies the caller of the reason for the unavailability and the period of time during which calls cannot be answered, and a response program attaching means sends a response program. Accordingly, in the answering and guiding system for unanswered calls, the mobile phone on the transmitting end can analyze the contents of the notification about the unavailability, activate the sent response program, and easily send a request for a reply to the receiving end through a responding unit. Meanwhile, the receiving end can analyze, through a responding unit, the response information containing the contents of the response from the transmitting end, and can automatically respond to the response information by an appropriate method.

CITATION LIST

Patent Literature

Patent Literature 1: JP 2005-260417 A
Patent Literature 2: JP 2003-51884 A
Patent Literature 3: JP 2010-130379 A

SUMMARY

Technical Problem

The methods and systems disclosed in Patent Literatures 1 through 3 can further improve the call answering function. Particularly, in the system disclosed in Patent Literature 3, a caller who has made a call can obtain information about the recipient on the receiving end, and can transmit a request through a simple operation.

However, there is room for improvement in communication systems having call answering functions. The present invention has been made in view of those circumstances, and the object thereof is to provide a communication system that can enhance the functions to be provided through a call answering function.

Solution to Problem

The present invention is a communication system including a call answering center; a first mobile phone configured to register a call answering setting in the call answering center; a second mobile phone configured to make a call to the first mobile phone, the second mobile phone including a display unit and an operation unit; and a telephone communication network configured to connect the first mobile phone, the second mobile phone, and the call answering center in a communicable manner, wherein, when the second mobile phone makes a call to the first mobile phone, and it is determined that the call answering setting is performed, the call answering center composes a call answering message accompanied by a reply program having an advertisement image attached thereto in accordance with the call answering setting, and transmits the call answering message to the second mobile phone, and, upon receiving the call answering message, the second mobile phone causes the display unit to display an image of the reply program having the advertisement image superimposed thereon.

Advantageous Effects of Invention

The present invention can further enhance functions that can be provided through a call answering function.

BRIEF DESCRIPTION OF DRAWINGS

FIG. 29 is a flowchart illustrating an example of processing operations to be performed by a mobile phone.

DESCRIPTION OF EMBODIMENTS

The following is a detailed description of the present invention, with reference to the drawings. It should be noted that the present invention is not limited to the following modes (hereinafter referred to as the embodiments) for carrying out the invention. The components described in the following embodiments encompass components easily derived by those skilled in the art from the components described in the following embodiments, or substantially the same as the components described in the following embodiments, and components within the so-called equivalent scope of the components described in the following embodiment. Further, it is possible to combine the components disclosed in the following embodiments, where appropriate.

Embodiments of communication systems according to the present invention will be described below in detail, with reference to the drawings. However, the present invention is not limited to those embodiments.

[Communication System]

Figure 1:
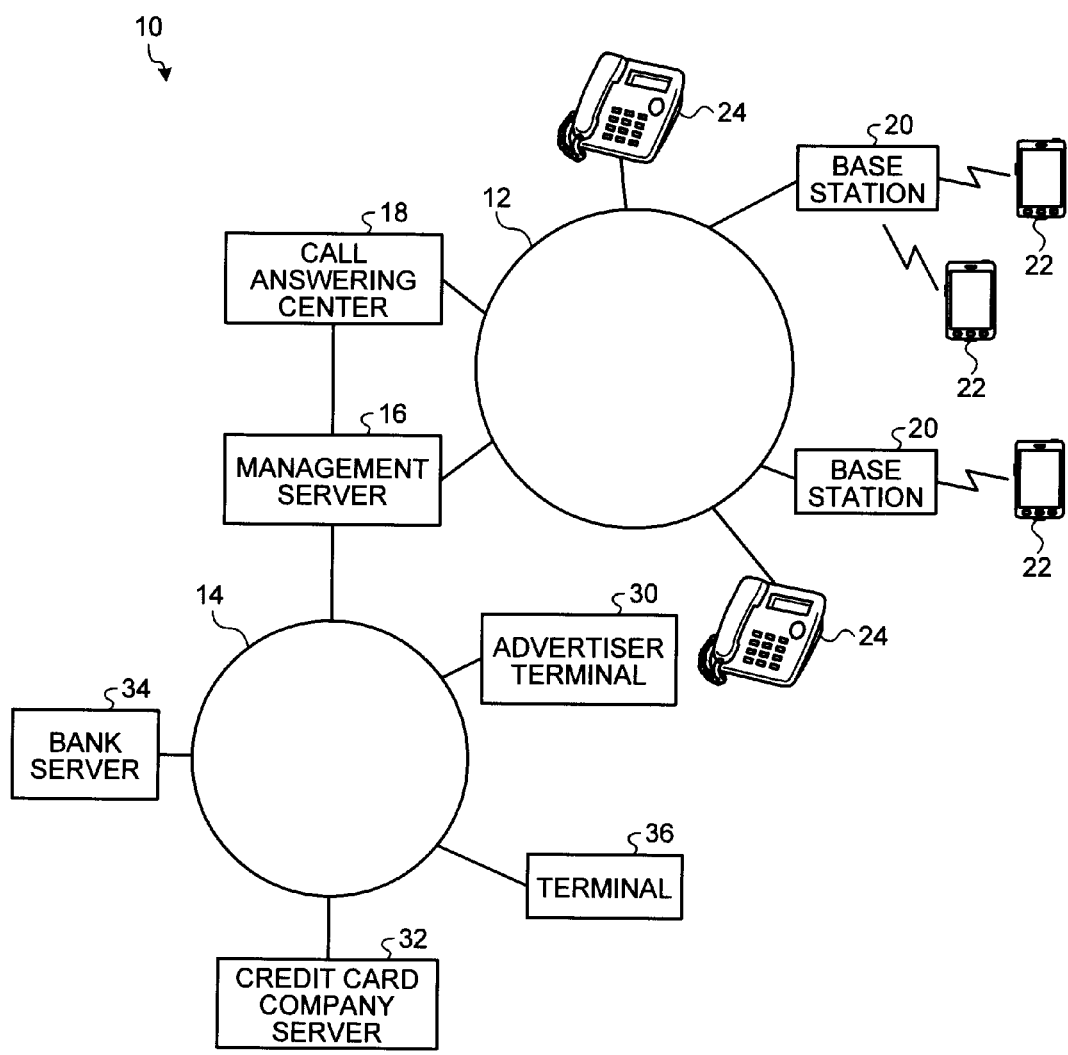
FIG. 1 is a schematic view of a general structure of a communication system.

FIG. 1 is a schematic view of a general structure of a communication system. A communication system 10 is a system that controls telephone communication and data communication between mobile phones and other devices. The communication system 10 provides a call answering function (a call answering service) to mobile phones.

The communication system 10 of this embodiment includes a telephone communication network 12, an Internet communication network 14, a management server 16, a call answering center 18, mobile phones 22, fixed-line phones 24, an advertiser terminal 30, a credit card company server 32, a bank server 34, and a terminal 36. The number of advertiser terminals 30, the number of credit card company servers 32, the number of bank servers 34, and the number of terminals 36 are not limited to one, and may be larger than one. The Internet communication network 14 may be connected to other various kinds of servers and terminals.

The telephone communication network 12 is a group of communication lines for data transmission and reception among communication devices connected thereto. The management server 16, the call answering center 18, the mobile phones 22, and the fixed-line phones 24 are connected to the telephone communication network 12. The telephone communication network 12 includes base stations 20. The base stations 20 are communication devices that perform wireless communication with the mobile phones 22. The base stations 20 communicate with the mobile phones 22 located within service areas in which radio waves of a certain intensity or higher can be received. Thereby, the mobile phones 22 can communicate with the telephone communication network 12. Accordingly, the telephone communication network 12 can wirelessly transmit and receive data to and from the mobile phones 22. The telephone communication network 12 realizes voice communication by allowing data (such as audio signals) transmission and reception between a mobile phone 22 and a fixed-line phone 24, between a mobile phone 22 and another mobile phone 22, or between a fixed-line phone 24 and another fixed-line phone 24, which are connected to the communication network. The telephone communication network 12 can also allow data communication between communication devices (a mobile phone 22 and a fixed-line phone 24) connected to the communication network. The telephone communication network 12 can also allow data transmission and reception between the management server 16 and a mobile phone 22 or a fixed-line phone 24. The telephone communication network 12 can also allow data transmission and reception between the call answering center 18 and a mobile phone 22 or a fixed-line phone 24.

The Internet communication network 14 is a group of communication lines for data transmission and reception among communication devices connected thereto. The management server 16, the advertiser terminal 30, the credit card company server 32, the bank server 34, and the terminal 36 are connected to the Internet communication network 14. The Internet communication network 14 realizes data communication by allowing information transmission and reception between devices connected thereto.

The management server 16 is connected to the telephone communication network 12, the Internet communication network 14, and the call answering center 18. The management server 16 is a device that manages communication among respective communication devices connected to the telephone communication network 12. Specifically, the management server 16 manages communication among the mobile phones 22, the fixed-line phones 24, and the other communication devices. The management server 16 also manages communication between the call answering center 18 and the other communication devices. The management server 16 further has a function as a gate or a provider that manages connections between the respective communications devices connected to the Internet communication network 14 and the respective communication devices connected to the telephone communication network 12. For example, the management server 16 can transmit information from the mobile phones 22 to the advertising terminal 30 by allowing data transmission and reception between the advertising terminal 30 connected to the Internet communication network 14 and the mobile phones 22 connected to the telephone communication network 12.

The call answering center 18 is an electronic device such as a server that has a function to sort and manage various kinds of information, and is connected to the telephone communication network 12 and the management server 16. The call answering center 18 provides a call answering function to the mobile phones 22 and the fixed-line phones 24 connected to the telephone communication network 12. In this embodiment, the call answering center 18 is configured independently of the management server 16, but is not limited thereto. The call answering center 18 may be included or integrated in the management server 16.

Figure 2:
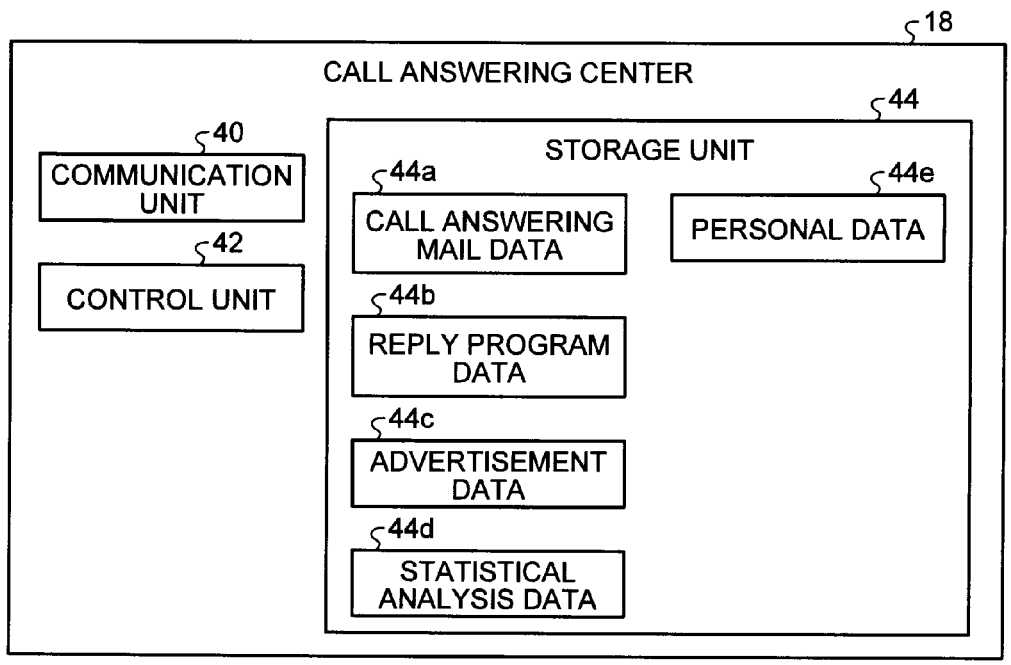
FIG. 2 is a schematic view of a general structure of a call answering center.

FIG. 2 is a schematic view of a general structure of the call answering center. Referring now to FIG. 2, the structure of the call answering center 18 is described. As illustrated in FIG. 2, the call answering center 18 includes a communication unit 40, a control unit 42, and a storage unit 44. The communication unit 40 communicates with the telephone communication network 12 and the management server 16. The communication unit 40 transmits data acquired through communication to the control unit 42 and the storage unit 44, and outputs data, which has been output from the control unit 42 and the storage unit 44, to other communication devices (a communication device and the management server 16 connected thereto via the telephone communication network 12). The control unit 42 is a device such as a CPU that has an arithmetic processing function, and controls operations of respective components of the call answering center 18.

The storage unit 44 is a storage device that stores data, including call answering mail data 44a, reply program data 44b, advertisement data 44c, statistical analysis data 44d, and personal data 44e.

The call answering mail data 44a contains various kinds of information about mails (call answering mails) to be output in an operation performed by the call answering function. Specifically, the various kinds of information include a call answering mail frame, text for use in call answering mails, transmission settings, transmission conditions, and the like. The control unit 42 extracts and processes part of the data contained in the call answering mail data 44a, to compose a call answering mail to be transmitted.

The reply program data 44b contains various kinds of information about a reply program to be attached to call answering mails. A reply program is a program to be executed by electronic devices (mainly, the mobile phones 22) that have received call answering mails. A mobile phone 22 executes the reply program, to transmit predetermined information, more specifically, a message to be relayed to the person who has made the call, to the call answering center 18. The reply program data 44b contains the reply program, various kinds of information to be attached to the reply program, and various kinds of information for processing the reply program.

The advertisement data 44c is a database that stores various kinds of information about advertisement images to be attached to the reply program. The advertisement data 44c contains the data of advertisement images, information about the advertisers providing the data of the advertisement images, the conditions for displaying the advertisement images, and the like. The advertisement data 44c contains advertisement images provided by advertisers that provide advertisement images. The advertisement data 44c also contains records of information about the fees to be paid by the advertisers for running advertisement images. As the advertisement data 44c, a single image may be registered as an advertisement image from a single advertiser, or a plurality of images may be registered as advertisement images.

The advertisement data 44c uses numbers and symbols to sort the business enterprises, non-profit organizations, and the like that provide advertisement images as information from advertisers. Accordingly, it is possible to cope with various kinds of search methods. The advertisement data 44c also contains information about the advertiser terminal 30 that is used by advertisers. Accordingly, information can be exchanged between the call answering center 18 and the advertiser terminal 30, and it is possible to replace one advertisement image with another, adjust criteria for display, and the like. The advertiser terminal 30 can access the call answering center 18, to check out the access record of advertisement images and the like.

The statistical analysis data 44d contains data obtained by statistically analyzing questionnaires issued from the call answering center 18 to the mobile phones 22, information necessary for carrying out the questionnaires, and the like. The questionnaires to be issued from the call answering center 18 to the mobile phones 22 will be described later.

The personal data 44e contains various kinds of information about the mobile phones 22 connected to the telephone communication network 12. The personal data 44e may further contain various kinds of information about the fixed-line phones 24. The various kinds of information about a mobile phone 22 include information (attribute information) about the user of the mobile phone 22, whether the user has a call answering service subscription, whether the user has an image subscription, and the like. Registered attributes of an image subscriber include mobile phone number, name, address, gender, age or age group (in teens, in early twenties, in late twenties, in early thirties, and so on), educational background, occupation, annual income or annual income level, credit card data and personal identification number, bank account and personal identification number, permission of the use of personal information, type of housing, and the like.

The mobile phones 22 are mobile electronic devices each having a function to perform telephone communication with other communication devices. The mobile phones 22 communicate with the telephone communication network 12 by performing wireless communication with the base stations 20 located within service areas. Thereby, when located within the service areas in which communication with the base stations 20 is possible, the mobile phones 22 can perform telephone communication, and accordingly, can communicate with the telephone communication network 12 in various places. Although FIG. 1 illustrates a case where smartphones are used as the mobile phones 22, the mobile phones 22 may be so-called feature phones or mobile communication devices having simple features. The mobile phones 22 can use various kinds of wireless communication methods. For example, communication may be performed through a 3G line, may be performed by using a Wi-Fi function, or may be performed by using a wireless LAN.

Figure 3:
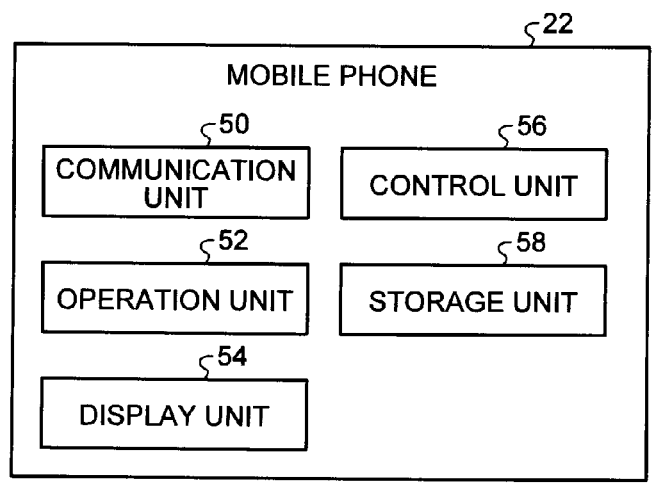
FIG. 3 is a schematic view of a general structure of a mobile phone.

FIG. 3 is a schematic view of a general structure of a mobile phone. As illustrated in FIG. 3, a mobile phone 22 includes a communication unit 50, an operation unit 52, a display unit 54, a control unit 56, and a storage unit 58. The communication unit 50 communicates with the base stations 20 of the telephone communication network 12. More specifically, the communication unit 50 searches for base stations 20 in the service areas, identifies the base station 20 with which communication is to be performed among the detected base stations 20, establishes communication with the base station 20, and then communicates with the base station 20 with which communication is established. The communication unit 50 transmits data acquired through communication to the control unit 56 and the storage unit 58, and outputs data, which has been output from the control unit 56 and the storage unit 58, to another communication device (a communication device connected thereto via the telephone communication network 12).

The operation unit 52 is a device through which a user of the mobile phone 22 inputs operations. The operation unit 52 may be a touch panel, a keyboard, cursor keys, and buttons, for example. A receiver may be used as the operation unit 52. The mobile phone 22 can also recognize an operation by voice acquired from the receiver. The display unit 54 is a device such as a display device that displays images. The display unit 54 displays a screen including various kinds of images, such as an operation screen and a screen showing a message. The control unit 56 is a device such as a CPU that has an arithmetic processing function, and controls operations of respective components of the mobile phone 22.

The storage unit 58 is a storage device that stores data. The storage unit 58 stores various kinds of functions to be performed by the control unit 56, application programs, and data necessary for telephone calls and communication. The storage unit 58 stores programs, such as a program for performing the call answering function, a program for performing a verbal communication function, and a program for executing a mail application. The storage unit 58 stores data, such as data to be used by the call answering function, address book data, and various kinds of image data.

The fixed-line phones 24 are mobile electronic devices that have functions to perform verbal communication with other communication devices. Except for being connected to the telephone communication network 12 by cable, the fixed-line phones 24 each have the same structure as the mobile phones 22. Compared with the mobile phones 22, the fixed-line phones 24 specialize in verbal communication functions, and some of them have a fewer number of functions.

The advertiser terminal 30 is an electronic device such as a personal computer, and performs communication via the Internet communication network 14. The advertiser terminal 30 communicates with the management server 16, to provide data and images to be used in operations to be performed by the call answering center 18. The advertiser terminal 30 is a terminal to which advertisers input various kinds of information. Information about advertisement images to be displayed, display conditions, and the like are input to the terminal, and are transmitted to the call answering center 18 via the management server 16.

The credit card company server 32 is a server owned by a credit card company. The credit card company server 32 communicates with other communication devices via the Internet communication network 14. The credit card company server 32 communicates with the call answering center 18 via the management server 16. The credit card company server 32 acquires payment information and the like, and charges the credit card corresponding to the payment information. Upon receiving information about an payment operation, it is determined whether the information contained in the payment information is correct.

The bank server 34 is a server owned by a bank. The bank server 34 communicates with other communication devices via the Internet communication network 14, and communicates with the call answering center 18 via the management server 16. The bank server 34 acquires payment information, transfer information, debit information, and the like, and transfers money from the bank account corresponding to the acquired information to another bank account. Upon receiving processing information, it is determined whether information contained in the acquired information is correct.

The terminal 36 is an electronic device such as a personal computer, and performs communication via the Internet communication network 14. The terminal 36 communicates with the management server 16, to provide data and images to be used in processing to be performed by the call answering center 18.

Although the communication system 10 of this embodiment includes one telephone communication network 12 and one Internet communication network 14, the communication system 10 may include a plurality of telephone communication networks 12 and a plurality of Internet communication networks 14, all of which may be connected to one another via the management server 16. In other words, the communication system 10 may use the management server 16 as a gate to other networks (the other telephone communication networks 12 and the other Internet communication networks 14), so that communication with other networks becomes possible via the management server 16. Thereby, the voice communication with the mobile phones 22 connected to the other networks becomes possible, and the data communication with terminals 36 of the other networks becomes possible.

[Processing Operations of the Communication System 10]

Referring now to FIGS. 4 through 14, an example of processing operation of the communication system 10 is described.

[Processing Operations in Call Answering Setting of Mobile Phone]

Figure 4:
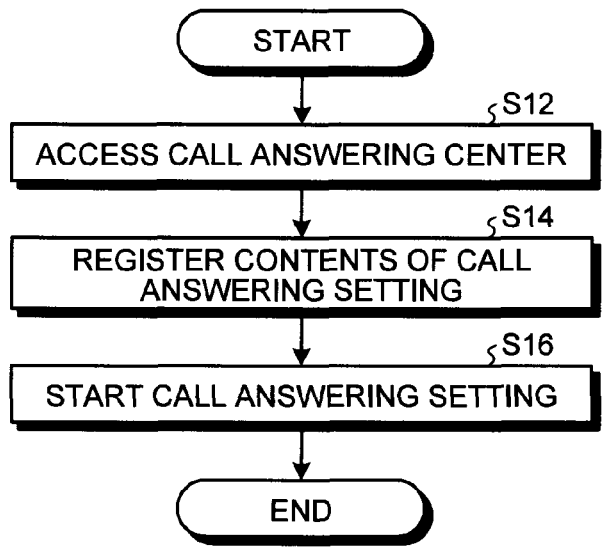
FIG. 4 is a flowchart illustrating an example of processing operations to be performed by a mobile phone.
Figure 5:
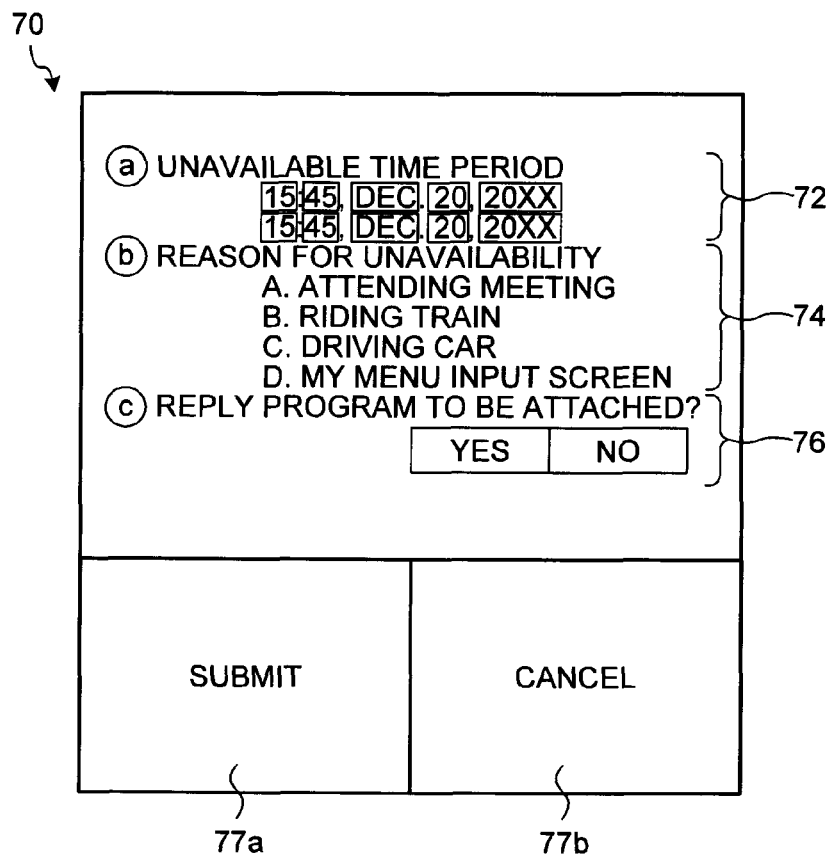
FIG. 5 is a diagram for explaining an example of a screen.

FIG. 4 is a flowchart illustrating an example of processing operations to be performed by a mobile phone. FIG. 5 is a diagram for explaining an example of a screen. The mobile phone 22 can realize processing illustrated in FIGS. 4 and 5, by making the control unit 56 perform an arithmetic processing and control operations of respective units, on the basis of data acquired from an outside through the communication unit 50, or data stored in the storage unit 58.

The mobile phone 22 presets various settings (call answering settings) and makes the call answering center 18 store the preset settings, when performing a call answering function. At Step S12, the mobile phone 22 accesses the call answering center 18, and at Step S14, registers the contents of the call answering settings. Specifically, once the mobile phone 22 accesses the call answering center 18, data is transmitted from the call answering center 18. The mobile phone 22 displays a screen 70 as illustrated in FIG. 5, on the basis of the data transmitted from the call answering center 18.

The screen 70 illustrated in FIG. 5 is a screen through which various kinds of information necessary for the call answering settings can be input, and includes an item 72 for inputting an unavailable time period, an item 74 for inputting a reason for the unavailability, an item 76 for choosing whether to attach the reply program, and buttons 77a and 77b. The user of the mobile phone 22 inputs operations to the operation unit 52 while looking at the screen 70 displayed on the display unit 54. Thereby, the user can input operations corresponding to the items 72, 74, and 76, and input a confirming operation through the button 77a or 77b.

The item 72 includes a column for inputting the year, month, day, hour, and minute of the time when the unavailable period starts, and a column for inputting the year, month, day, hour, and minute of the time when the unavailable period ends. The item 74 allows the user to select the reason for the unavailability, or the reason that the user cannot answer the phone, from the four reasons: "A. attending a meeting", "B. riding on a train", "C. driving a car", and "D. My Menu input screen". Incidentally, when "D. My Menu input screen" is selected, a screen is displayed through which the user can freely input any text as a reason of absence. The item 76 includes a button to choose whether to attach the reply program. The button 77*a* is a button for a confirming operation, i.e. a button to input an operation to confirm the call answering settings. The button 77*b* is a button for a cancel operation, i.e. a button to input an operation not to confirm but to cancel the call answering setting processing. Incidentally, the screen 70 illustrated in FIG. 5 is an initial screen in which the present time "15:45, Dec. 20, 20xx" is displayed as the item 72. When operations are input for respective items and the confirmation button 77*a* is pressed while the screen 70 is displayed, the mobile phone 22 registers the input information. Incidentally, the call answering center 18 identifies the mobile phone 22 which access the call answering center 18 by use of a telephone number or the like thereof, and the call answering center 18 registers the input information as the call answering setting for the identified mobile phone 22.

Upon registering the contents of settings at Step S14, the mobile phone 22 starts the call answering settings at Step S16, i.e. starts a processing based on the settings, and ends the present processing. In other words, the mobile phone 22 starts a processing to perform a call answering function under the set conditions. Thereby, when a call is made to the target mobile phone 22, the call answering center 18 can provide the call answering function on the basis of the call answering settings. Incidentally, the call answering center 18 may start the processing based on the registered settings when the call answering settings are input, or may start the processing based on the registered settings when a predetermined time input in the setting processing is elapsed, or may start the processing based on the registered settings when a start operation is input by the mobile phone 22.

[Processing Operations of the Call Answering Center]

Figure 6:
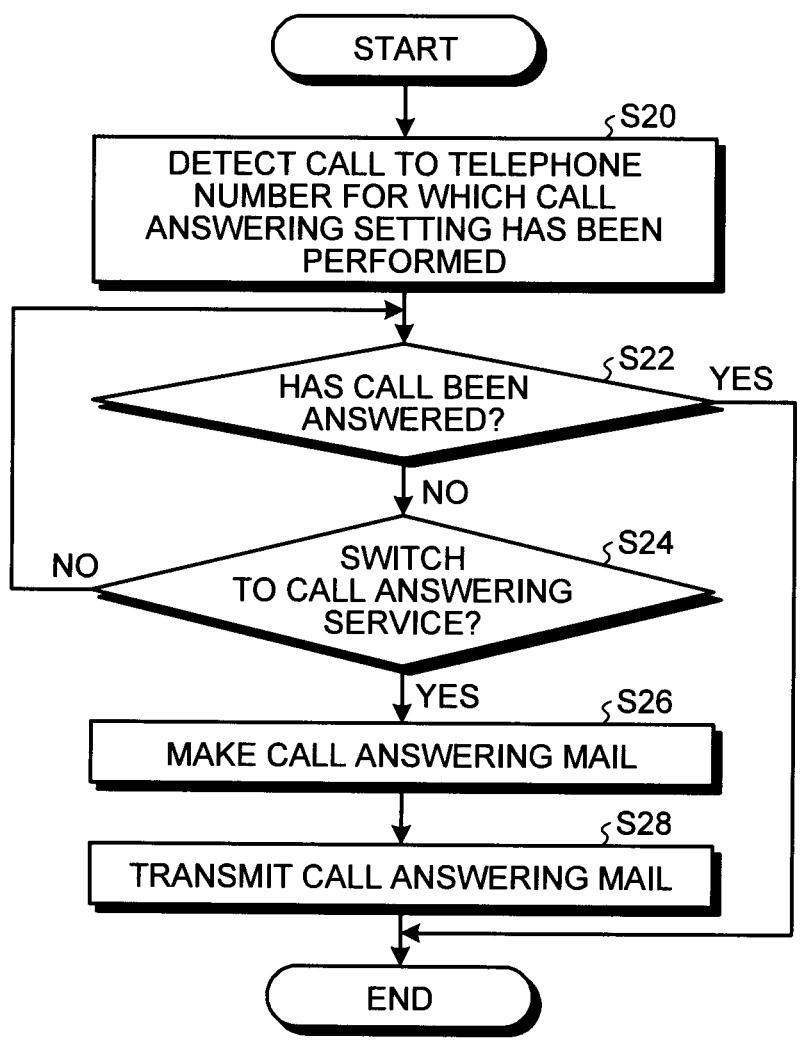
FIG. 6 is a flowchart illustrating an example of processing operations to be performed by the call answering center.
Figure 7:
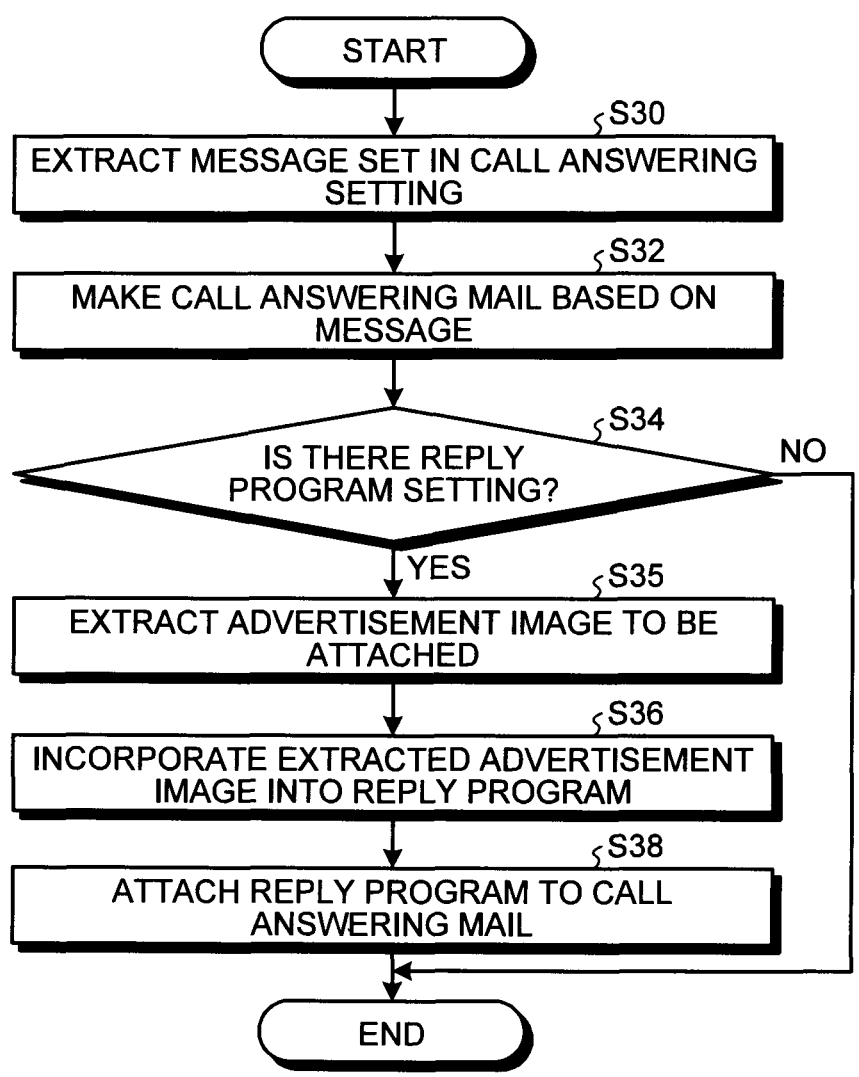
FIG. 7 is a flowchart illustrating an example of processing operations to be performed by the call answering center.

Referring now to FIGS. 6 and 7, an example of processing operations to be performed by the call answering center is described. FIGS. 6 and 7 are flowcharts illustrating an example of processing operations to be performed by the call answering center. The call answering center 18 can perform the processing illustrated in FIGS. 6 and 7, by making the control unit 42 execute a program, on the basis of various kinds of data stored in the storage unit 44.

At Step S20, the call answering center 18 detects a call to a telephone number associated with which the call answering settings are registered. If any call is detected at Step S20, the call answering center 18 determines whether any receiving operation is performed at Step S22. If it is determined that the receiving operation is performed at Step S22 (Yes at Step S22), the call answering center 18 ends the present processing.

If it is determined that the receiving operation is not performed at Step S22 (No at Step S22), the call answering center 18 determines whether to switch to the call answering service at Step S24. If it is determined not to switch to the call answering service (No at Step S24), the call answering center 18 goes to Step S22 to repeat the above-mentioned processing.

If it is determined to switch to the call answering service at Step S24 (Yes at Step S24), the call answering center 18 composes a call answering mail at Step S26, sends the call answering mail at Step S28, and ends the present processing. Thus, the call answering center 18 can send the mail to a mobile phone which made the call on the transmitting end, the mail containing a reason why a mobile phone on the receiving end cannot answer the call and containing the information about a time period during which the mobile phone on the receiving end cannot answer.

Referring now to FIG. 7, an explanation will be made on the processing at Step S26 to compose the call answering mail. At Step S30, the call answering center 18 extracts a message set in the call answering settings. At Step S32, the call answering center 18 composes the call answering mail on the basis of the extracted message. Specifically, the call answering center 18 extracts the information about the reason of absence and incorporates the information into the mail. The call answering center 18 further extracts an unavailable time period from the registered unavailable time period, and adds the extracted time period as text to the mail.

Upon making the mail at Step S32, the call answering center 18 determines whether there is a setting of the reply program, i.e. whether to attach the reply program to the mail, at Step S34. If it is determined that there is no setting of the reply program (No at Step S34), the call answering center 18 ends the present processing.

If it is determined that there is the setting of the reply program (Yes at Step S34), the call answering center 18 extracts an advertisement image to be attached at Step S35, incorporates (attaches) the extracted advertisement image to the reply program at Step S36, attaches the reply program to the call answering mail at Step S38, and ends the present processing.

By performing the above processing, the call answering center 18 can attach the reply program, to which the advertisement image is incorporated, to the call answering mail. By sending the reply program, the call answering center 18 can acquire an intention of an owner of the mobile phone which made a call on the transmitting end, in accordance with a format of an own device.

[Processing Operations on Making a Call from a Mobile Phone]

Figure 8:
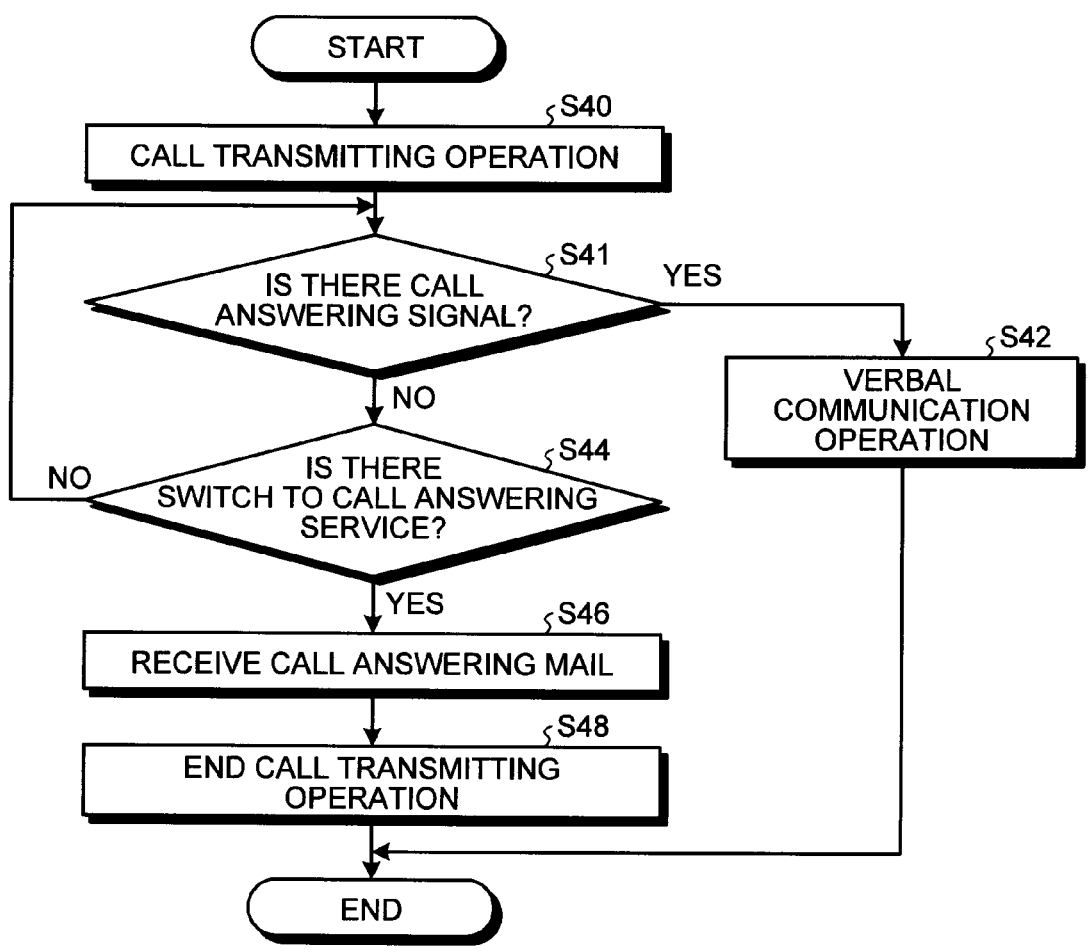
FIG. 8 is a flowchart illustrating an example of processing operations to be performed by a mobile phone.
Figure 9:
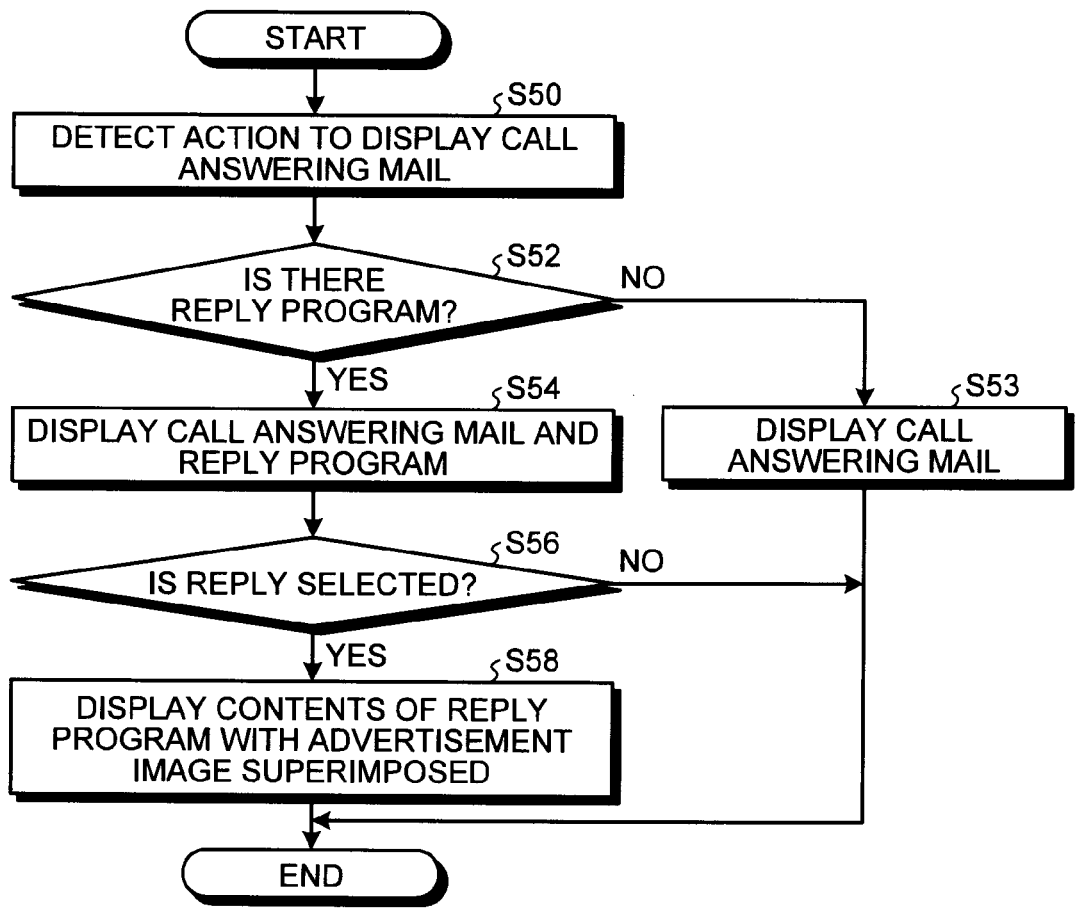
FIG. 9 is a flowchart illustrating an example of processing operations to be performed by a mobile phone.
Figure 10:
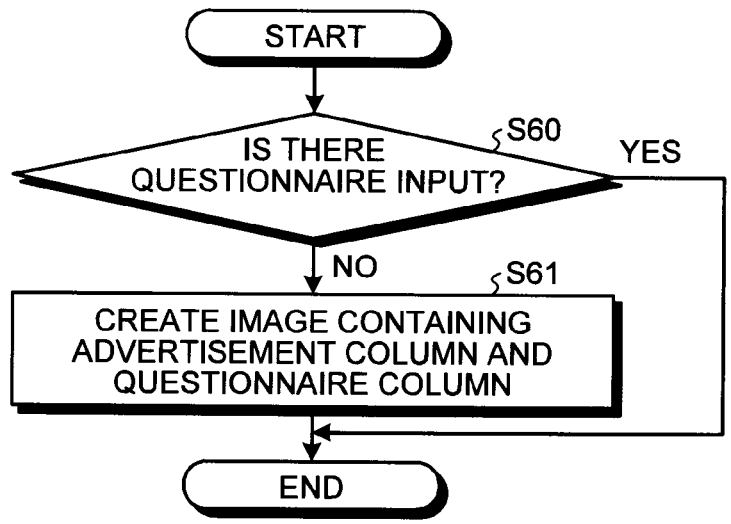
FIG. 10 is a flowchart illustrating an example of processing operations to be performed by a call answering center.
Figure 11:
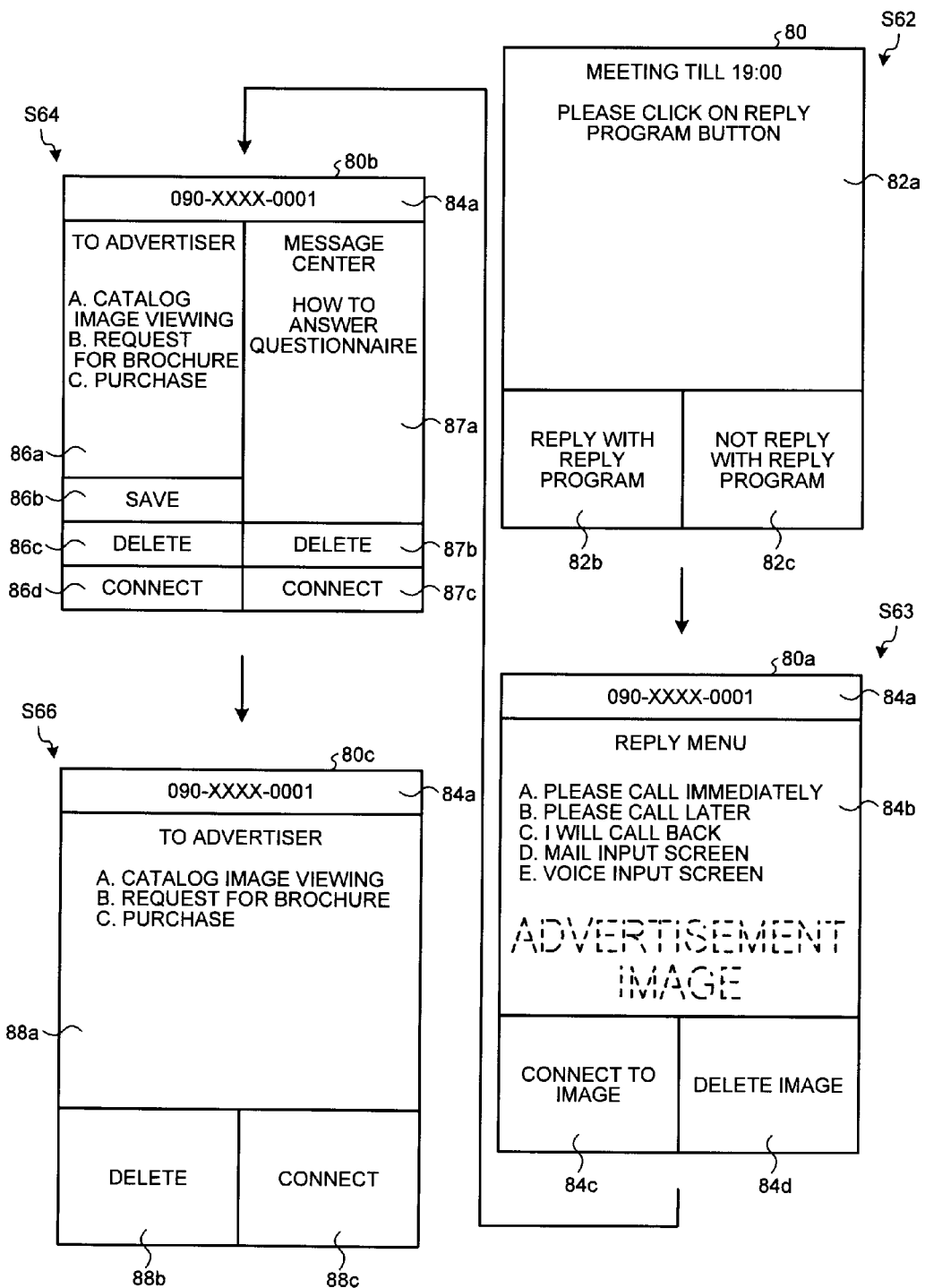
FIG. 11 is a diagram for explaining an example of a transition of screens to be displayed on a mobile phone.
Figure 12:
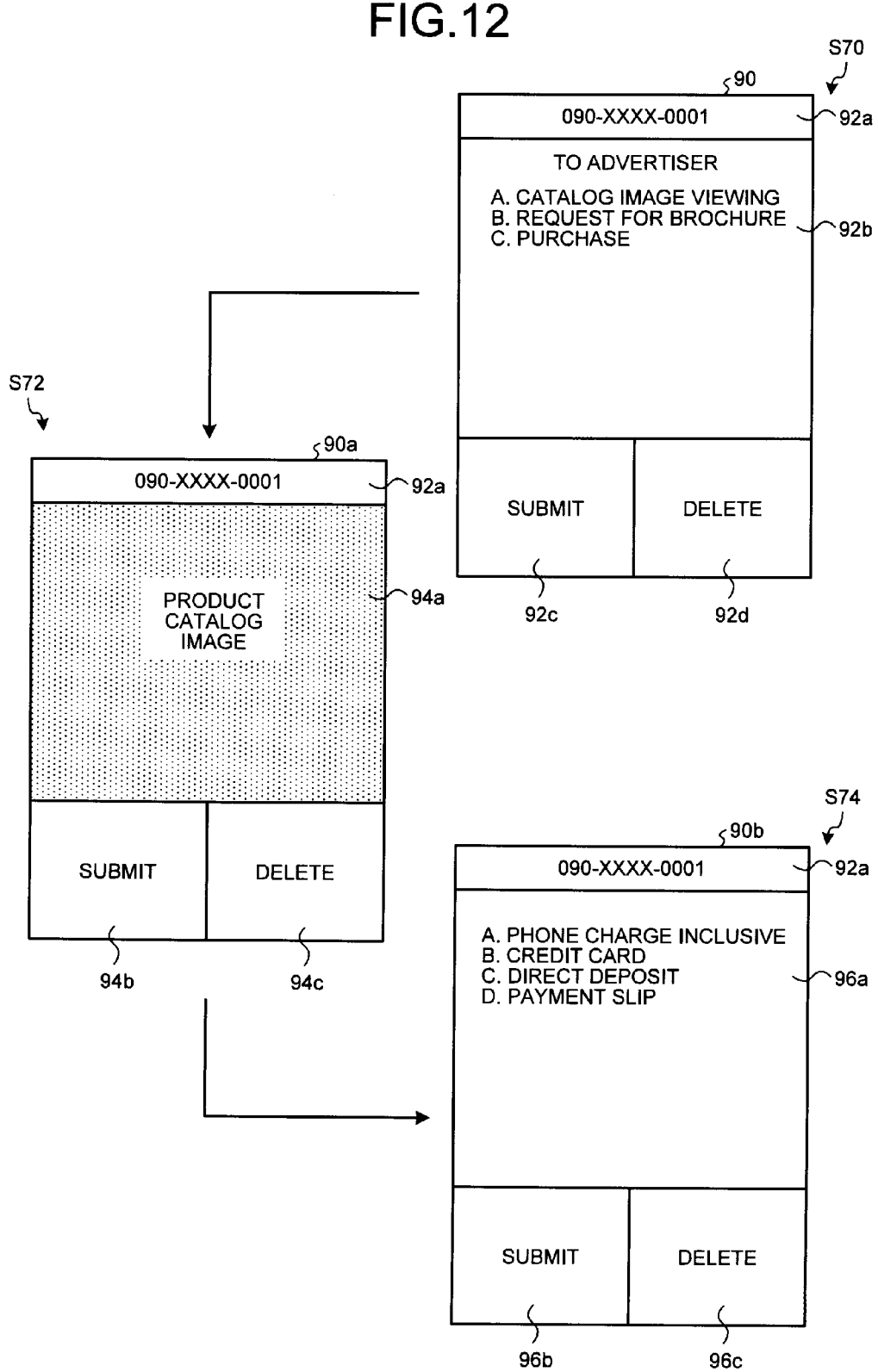
FIG. 12 is a diagram for explaining an example of a transition of screens to be displayed on a mobile phone.
Figure 13:
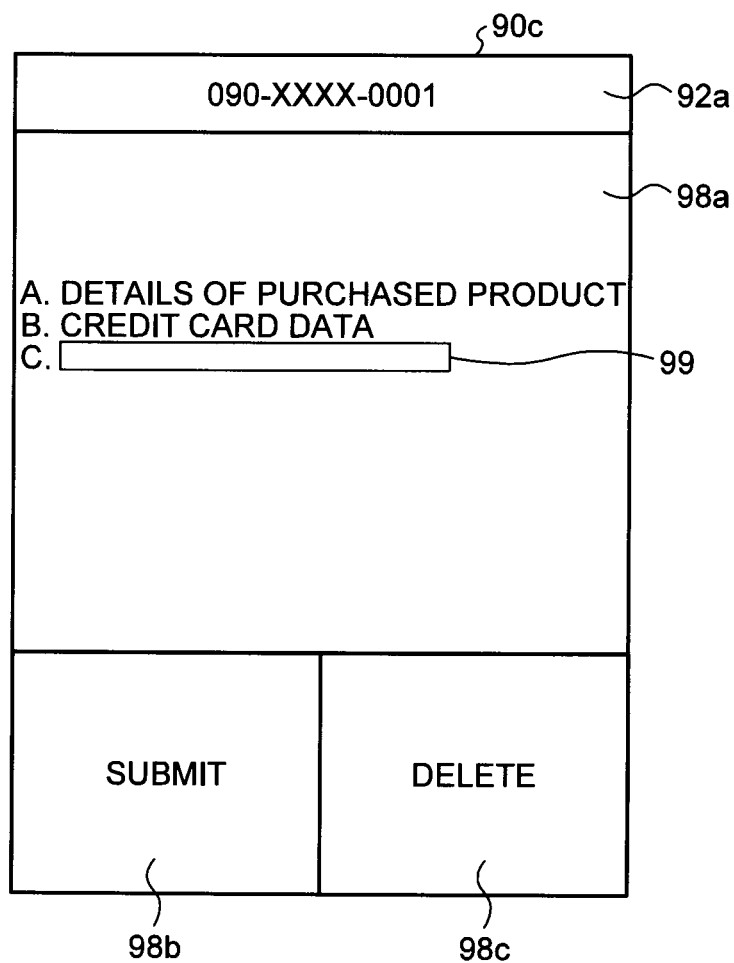
FIG. 13 is a diagram for explaining an example of a screen.

Referring now to FIGS. 8 through 13, an explanation is made on an example of processing to be performed by a mobile phone which makes a call. FIGS. 8 and 9 are flowcharts each illustrating an example of processing operations to be performed by the mobile phone. FIG. 10 is a flowchart illustrating an example of processing operations to be performed by the call answering center. FIGS. 11 and 12 are diagrams each for explaining an example of a transition of screens to be displayed on the mobile phone. FIG. 13 is a diagram for explaining an example of a screen. In this embodiment, the mobile phone which receives an incoming call, i.e. which is on the receiving end, is a first mobile phone, and the mobile phone which makes an outgoing call, i.e. which is on the transmitting end, is a second mobile phone.

At Step S40, a mobile phone 22 detects an outgoing call operation, and performs the outgoing call processing. Upon performing the outgoing call processing at Step S40, the mobile phone 22 determines whether there is any receiving signal at Step S41. In other words, it is determined whether a signal is received, the signal indicating that a mobile phone to receive the incoming call (another mobile phone 22 in the present embodiment) performs any receiving operation. If it is determined that there is the receiving signal at Step S41 (Yes at Step S41), the mobile phone 22 performs a telephone call processing, i.e. starts a telephone communication, and ends the present processing.

If it is determined that there is no receiving signal at Step S41 (No at Step S41), the mobile phone 22 determines whether there is a switch to the call answering service at Step S44. If it is determined that there is no switch at Step S44 (No at Step S44), the mobile phone 22 proceeds to Step S41.

If it is determined that there is the switch at Step S44 (Yes at Step S44), the mobile phone 22 receives the call answering mail at Step S46, ends the outgoing call processing at Step S48, and ends the present processing.

Upon receiving the call answering mail from the call answering center 18 at Step S46, the mobile phone 22 starts separately the processing illustrated in FIG. 9. The mobile phone 22 detects a display operation of the call answering mail at Step S50, and determines whether there is the reply program, i.e. whether the reply program is attached to the call answering mail, at Step S52.

If it is determined that there is no reply program at Step S52 (No at Step S52), the mobile phone 22 makes the display unit 54 display the call answering mail at Step S53, and ends the present processing. If it is determined that there is the reply program at Step S52 (Yes at Step S52), the mobile phone 22 causes the display unit 54 to display the call answering mail with the reply program at Step S54. Incidentally, the mobile phone 22 may display only a button for inputting an operation to display the contents corresponding to the reply program.

Upon displaying the call answering mail with the reply program at Step S54, the mobile phone 22 determines whether a reply is selected at Step S56. In other words, it is determined whether it is selected to perform a reply processing with use of the reply program. If it is determined that the reply is not selected at Step S56 (No at Step S56), the mobile phone 22 ends the present processing.

If it is determined that the reply is selected at Step S56 (Yes at Step S56), the mobile phone 22 displays the contents of the reply program having an advertisement image superimposed thereon at Step S58, and then ends the present processing.

Referring now to FIGS. 10 through 13, the operations of the mobile phones 22 will be described in further detail, by explaining transitions among screens to be displayed on the display unit.

First, when any operation for advertisement images is input in the reply program, the call answering center 18 according to the present embodiment adds a function to display a screen through which various operations associated with the intended advertisement image, or adds one or more image to be displayed. In other words, the call answering center 18 adds to the reply program, a function to perform a display processing for advertisement images. Thereby, the mobile phone 22 can perform the processing which corresponds to the operation input in response to the advertisement image, even without performing the communication with the call answering center 18 or the management server 16. Furthermore, in addition to the advertisement image, the reply program can attach and display an image relating to questionnaires. The call answering center 18 can switch images to be displayed on the display unit through the attached reply program, by performing a processing illustrated in FIG. 10.

At Step S60, the call answering center 18 determines whether there is a questionnaire input. In other words, the call answering center 18 determines whether the target mobile phone 22 has answered the questionnaire.

If it is determined that there is a questionnaire input at Step S60 (Yes at Step S60), the call answering center 18 ends the processing directly. In this case, the call answering center 18 attaches only the advertisement image and the corresponding screen to the reply program. If it is determined that there is no questionnaire input at Step S60 (No at Step S60), the call answering center 18 creates an image containing an advertisement column and a questionnaire column at Step S61, and then ends the present processing.

Referring now to FIG. 11, an example of transitions among screens to be displayed when a call answering mail is received. Upon receipt of a call answering mail via the communication unit, the mobile phone 22 causes the display unit 54 to display a screen, on the basis of controls and operations.

First, when detecting an operation to display a received call answering mail after receiving the call answering mail, the mobile phone 22 displays a screen 80 illustrated in Step S62. The screen 80 includes a message column 82a, a button 82b, and a button 82c. In the message column 82a, the text "Meeting till 19:00", which indicates the reason for unavailability and the unavailable time set in the call answering setting, and the text "Please click on the reply program button", which encourages the user to start the reply program, are displayed as the text of the call answering mail. The button 82b is the button for inputting an operation to select a reply using the reply program. The button 82c is the button for inputting an operation not to select a reply using the reply program. If the button 82c is operated at Step S62, the mobile phone 22 does not perform the processing based on the reply program, and ends the present processing.

If the button 82b is operated at Step S62, the mobile phone 22 causes the display unit 54 to display a screen 80a at Step S63. The screen 80a includes an item 84a for identifying the recipient of the call, an item 84b for selecting a message to be sent to the mobile phone 22 on the receiving end, a button 84c, and a button 84d. An advertisement image is also displayed in the background of the screen 80a. In other words, in the screen 80a, the items 84a and 84b, and the buttons 84c, and 84d, which are created according to the reply program, are superimposed on the advertisement image. In the item 84a, information for identifying the mobile phone on the receiving end, which is the phone number in this embodiment, is displayed. The item 84a may display the name associated with the mobile phone on the receiving end, on the basis of the address book or the like stored in the storage unit 58. The item 84b is a screen for selecting a message the caller wishes to relay to the recipient, and displays options. The five options, "A. Please call immediately", "B. Please call later", "C. I will call back later", "D. Mail input screen", and "E. Voice input screen", are displayed in a selectable manner. The item 84b may further include an option for inputting text. The button 84c is the button for inputting an operation to connect to the information linked to the advertisement image displayed in the superimposing manner. The button 84d is the button for inputting an operation to delete the advertisement image displayed in the superimposing manner.

The mobile phone 22 displays the screen 80b by processing the information contained in the reply program. When the button 84d is operated at Step S63, the mobile phone 22 ends the display of the advertisement image. When an operation corresponding to the reply program is input, the mobile phone 22 transmits the input result to the call answering center 18. For example, when the processing is confirmed under condition that "A. Please call immediately" is selected in the reply menu of the item 84b, a message containing the text information "Please call immediately" is transmitted from the call answering center 18 to the mobile phone 22 on the receiving end.

When the button 84c is operated at Step S63, i.e. when detecting an operation for connecting to the image corresponding to the advertisement image, the mobile phone 22 causes the display unit 54 to display the screen 80b at Step S64. The screen 80b includes the item 84a for identifying the recipient of the call, an item 86a for selecting a processing corresponding to the advertisement image, buttons 86b, 86c, and 86d, an item 87a for displaying information about a questionnaire issued from the call answering center (a message center) 18, and buttons 87b and 87c. In the item 84a, information for identifying the mobile phone on the receiving end, which is the phone number in this embodiment, is displayed. In the item 86a, options set by the advertiser providing the advertisement image are displayed. Specifically, "A. Catalog image viewing", "B. Request for brochure", and "C. Purchase" are displayed. "Request for brochure" is an option for performing a processing to request information materials on a product or service, and "Purchase" is an option for performing a processing to purchase a product or apply for a service. The button 86b is the button for inputting an operation to perform a processing to temporarily save the item 86a currently being displayed. The button 86c is the button for inputting an operation to delete the display of the item 86a. The button 86d is the button for inputting an operation to perform the processing of the option selected in the item 86a. When the button 86c is selected, the mobile phone 22 deletes the display of the item 86a.

In the item 87a, "How to answer the questionnaire" is displayed as information about the questionnaire. The button 87b is the button for inputting an operation to delete the display of the item 87a. The button 87c is the button for inputting an operation to perform a processing to answer the questionnaire shown in the item 87a. When the button 87c is pressed, the mobile phone 22 transmits information indicating an intention to answer the questionnaire to the call answering center 18, and the call answering center 18 in return transmits the information necessary for the questionnaire. After that, the mobile phone 22 communicates with the call answering center 18, to answer the questionnaire. When the button 87b is selected, the mobile phone 22 deletes the display of the item 87a.

When the operation of the button 86d is detected at Step S64, which is a connecting operation relative to the item 86a, the mobile phone 22 communicates with the call answering center 18 to obtain data, and makes the display unit 54 display the screen 80c at Step S66. The screen 80c contains the item 84a for identifying the recipient of the call, an item 88a for selecting a processing corresponding to the advertisement image, and buttons 88b and 88c. The item 88a is the same item as the item 86a. The button 88b is the button for inputting an operation to delete the display of the item 88a. The button 88c is the button for inputting an operation to perform the processing of the option selected in the item 88a. When the button 88b is selected, the mobile phone 22 deletes the display of the item 88a. Incidentally, the mobile phone 22 may ends the processing to be performed through the reply program, when a button associated with a deletion is operated.

Referring now to FIG. 12, an explanation will be made on a processing which is performed by communicating with the call answering center 18 after the operation to select the advertisement image is input. As explained with reference to FIG. 11, upon detecting the operation of the button 86d which is a connecting operation relative to the item 86a at Step S64, the mobile phone 22 communicates with the call answering center 18 to display a screen 90 as illustrated at Step S70 of FIG. 12. The screen 90 contains an item 92a for identifying the recipient of the call, an item 92b for selecting a processing corresponding to the advertisement image, and buttons 92c and 92d. Incidentally, the screen 90 is the same screen as the above described screen 80c in FIG. 11.

Upon detecting the operation of the button 92c under condition that the option "A. Catalog image viewing" is selected in the item 92b at Step S70, the mobile phone 22 communicates with the call answering center 18 to obtain data, and causes the display unit 54 to display a screen 90a at Step S72. The screen 90a contains the item 92a for identifying the recipient of the call, a selected product catalog image 94a, and buttons 94b and 94c. In the catalog image 94a, products being displayed can be switched or selected through operations. The button 94b is the button for inputting an operation to perform a processing selected in the catalog image 94a. The button 94c is the button for inputting an operation to delete the display of the catalog image 94a. When the button 94c is selected, the mobile phone 22 deletes the display of the catalog image 94a, and ends the viewing of the image provided by the advertiser, a purchasing processing, and the like.

When a product purchase is selected and the button 94b is operated while the screen 90a of Step S72 is displayed, the mobile phone 22 displays a screen 90b at Step S74. The screen 90b contains the item 92a for identifying the recipient of the call, an item 96a showing options from which a payment method is to be selected, and buttons 96b and 96c. In the item 96a, the options include "A. Phone charge inclusive", "B. Credit card", "C. Direct deposit", and "D. Payment slip". "A. Phone charge inclusive" is a method of paying the purchase money together with a phone charge. "B. Credit card" is a method of paying the purchase money with a credit card. "C. Direct deposit" is a method of paying the purchase money via direct deposit. "D. Payment slip" is a method of receiving a payment slip and paying the purchase money by using the payment slip through a relevant institution. The button 94b is the button for inputting an operation to perform a processing selected in the item 96a. The button 94c is the button for inputting an operation to delete the display of the item 96a. When the button 96c is selected, the mobile phone 22 ends the processing without completing the purchasing processing.

Upon detecting the operation of the button 96b under condition that "B. Credit card" is selected in the item 96a at Step S74, the mobile phone 22 communicates with the call answering center 18 to obtain data, and causes the display unit 54 to display a screen 90c as illustrated in FIG. 13. The screen 90c contains the item 92a for identifying the recipient of the call, an item 98a showing the information to be used for payment with a credit card, and buttons 98b and 98c. The item 98a includes "A. Details of purchased product", "B. Credit card data", and a blank column 99. The blank column 99 is the column for inputting the security code or the expiry date of the credit card. The button 98b is the button for inputting an operation to perform a processing selected in the item 98a. The button 98c is the button for inputting an operation to delete the display of the item 98a. When the button 98c is selected, the mobile phone 22 ends the processing without completing the purchasing processing. Incidentally, at the time of payment, the communication system 10 can confirm identification by various kinds of methods. For example, it is possible to use at least one of a personal identification number, fingerprint authentication, and voice authentication. By using more than one method for confirming identification in this manner, safer transactions become possible. A variety of information which is set in the mobile phone 22 may be used as the information used for identification confirmation.

When the variety of information is input to the blank column 99, and the button 98b is operated, the mobile phone 22 transmits the input information to the call answering center 18. The call answering center 18 transmits the credit card information to the credit card company server 32 via the management server 16, and perform an authenticating processing. Upon completion of the authenticating processing, the call answering center 18 transmits the information to the advertiser terminal 30, and concludes a sales contract. After that, the call answering center 18 transmits information indicating the completion of purchasing to the mobile phone 22.

Furthermore, in the communication system 10, when a request for brochure is selected at Step S66, the call answering center 18 transmits an address confirmation mail (accompanied by the reply program) to the mobile phone 22. Upon completion of the authentication processing, or the confirmation of the address through the reply program in response to the address confirmation mail, the brochure or information material is sent from the advertiser by postal mail or the like.

As described above, by attaching an advertisement image to the reply program, the communication system 10 can display an advertisement when the reply program is used. Thereby, the call answering function, or more specifically, the call answering function to perform the processing related to the call answering service through operations on screens and with using the reply program can be more effectively used. The user of the mobile phone on the caller side confirms an unavailable situation on the callee side with the text information, and views advertisement images while operating the reply program. Thereby, the advertisement effect and the public relations effect are arisen. The advertisement image may also be stored into the storage unit of the mobile phone on the caller side. Thereby, at any time, the caller can purchase a product or service proposed by the advertiser, or request the brochure of the product or service, or viewing the catalogue image of the product or service, by using an access point (e.g. URL) of the advertiser which is set in the advertisement image.

Incidentally, in the communication system 10, the advertisement image is displayed as the background image. However, the advertisement may be displayed as another independent image, such as banner or the like in a vacant space of the screen. The advertisement image may be the image of the product, or may be displayed with using mail address, a telephone number, a QR code (a registered trademark), and so on.

The communication system 10 can obtain various kinds of information about the user of the mobile phone 22, by enabling a questionnaire survey. Furthermore, it is possible to increase the response rate of the questionnaire survey by issuing premium or reward points (will be described later) to be added to the questionee through the call answering function. Thereby, the questionnaire can be used for a market research of the advertiser, for example.

Furthermore, in the communication system 10, advertisement images can be directed not only to image subscribers but also to all the mobile phones. That is, an advertisement image can be sent to any mobile phone by calling a user who has set the call answering function. In this manner, products and service information can be very effectively advertised. By including the access points (link information) of advertisers and the call answering center in advertisement images, it is possible to move directly to a screen through which the user can do shopping. Thereby, an enormous effect can be obtained in the advertising, the sales promotion, or the market research. Furthermore, for the owner of the call answering center 18 and the management server 16 who operates the telecommunication network 12, it is possible to improve the frequency of use of the communication network and thereby improve earnings. Furthermore, for the advertising company which creates the advertisement image, it is possible to obtain a new advertisement medium and thereby create various kinds of advertisement images.

The owner of the call answering center 18 and the management server 16 who operates the telephone communication network 12 can increase the users of the call answering function, by improving the user-friendliness of the call answering function. The owners of the call answering center 18 and the management server 16 can earn the money for maintaining the call answering function, by collecting the advertising fees from the advertisers. Thereby, the use fee of the call answering function can be kept a low price.

Furthermore, the communication system 10 can display fund raise activities of non-profitable organizations, as the advertisement images, by including non-profitable organizations or public-interest corporations as users who use the advertiser terminal 30, in addition to enterprises. Thereby, the users of the call answering service, specifically the viewers of the reply program, can know the fund-raise activities only by viewing the advertisement images. Thereby, the communication system 10 can contribute to the charitable activities. Furthermore, the communication system 10 can treat the billing information managed by the management server 16 or the call answering center 18, as donations. Furthermore, according to the communication system 10, the administrators of the management server 16 and the call answering center 18 can review the users of the advertiser terminal 30 when the advertisements are applied. Thereby, it is possible to display advertisements from highly reliable non-profitable organizations or public-interest corporations. Therefore, it is possible to reduce the fraudulent fund-raising through malicious use of the system. Thereby, users can donate money safely.

Figure 14:
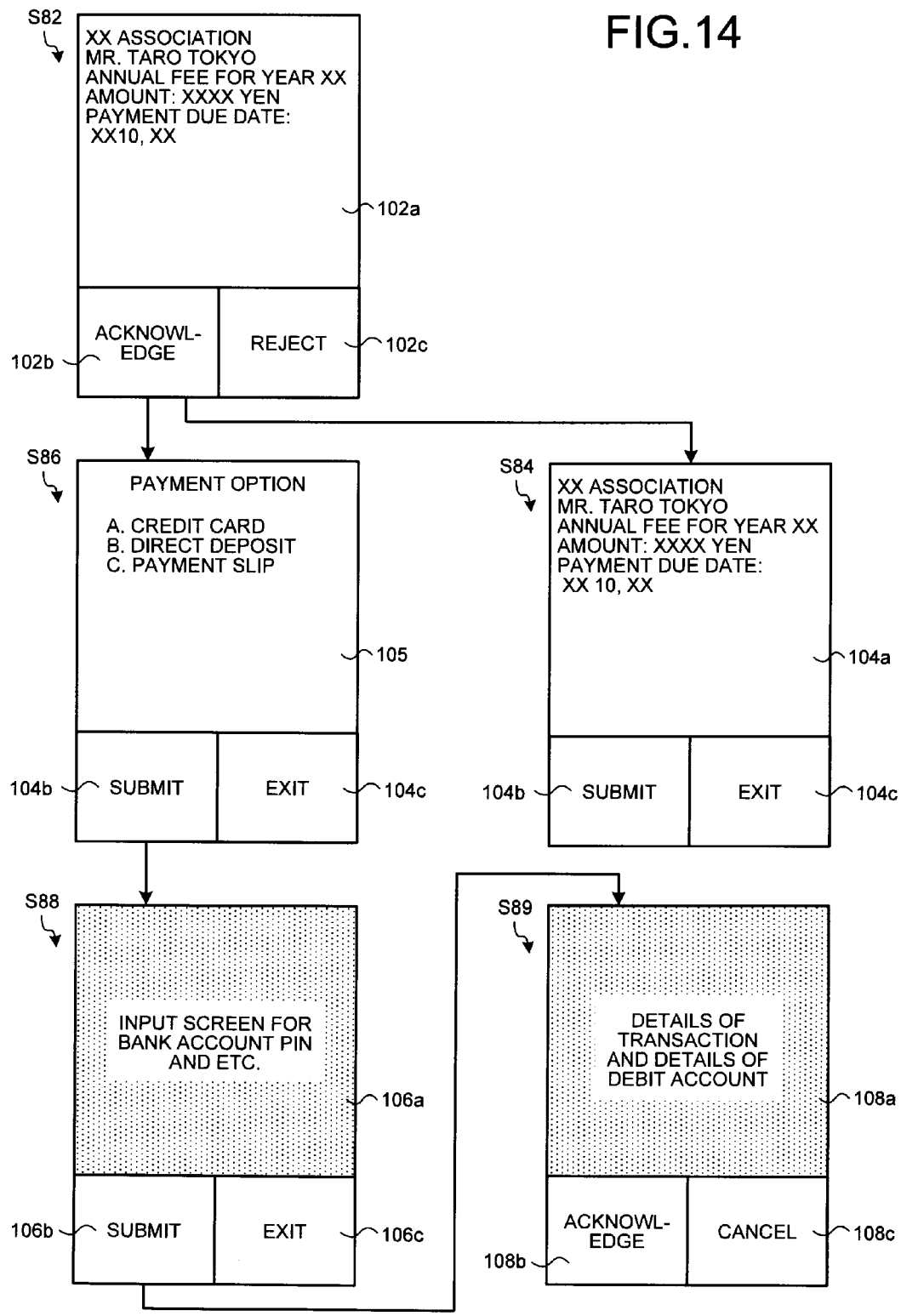
FIG. 14 is a diagram for explaining an example of a transition of screens to be displayed on a mobile phone.

Meanwhile, the communication system 10 can perform various kinds of processing with using the functions provided with the call answering service 18. For example, by transmitting a mail (message) accompanied by the reply program, the communication system 10 can charge the users of relevant mobile phones annual fees and the like. In this case, the demander who demands the annual fees and the like is the providers of advertisement images to be attached to the reply programs. The communication system 10 can perform the processing described below also for mobile phones for which the call answering setting has not been performed yet. FIG. 14 is a diagram for explaining an example of transitions among screens to be displayed on a mobile phone.

Upon receiving a mail accompanied by the reply program from the call answering center 18 and detecting an input of an operation to view the mail, the mobile phone 22 displays the screen of Step S82. The screen of Step S82 contains a display column 102a in which the mail message is displayed, and buttons 102b and 102c. The buttons 102b and 102c are displayed through the processing based on the reply program. The display column 102a shows the text "xx association, Mr. Taro Tokyo, Annual Fee for Year xx, Amount: xxxx YEN, Payment Due Date: 10 xx, xxxx". The button 102b is the button for inputting an operation to acknowledge the payment shown in the display column 102a. The button 102c is the button for inputting an operation to reject the payment shown in the display column 102a.

When the button 102c is selected, the mobile phone 22 does not make the payment shown in the mail, and ends the processing. Incidentally, when rejecting the payment, the information about the rejecting operation may be sent to the call answering center 18.

When the button 102b is operated while the screen of Step S82 is displayed and various kinds of settings have already been input, for example, when the previous payment has been made through the same system, the mobile phone 22 displays a screen as illustrated in Step S84. The screen of Step S84 contains a display column 104a in which the mail message is displayed, and buttons 104b and 104c. Incidentally, the display column 104a is the same image as the display column 102a. The button 104b is the button for inputting an operation to confirm that the payment shown in the display column 104a is to be made through the already set payment method. The button 104c is the button for inputting an operation to end the processing without making the payment. When the button 104c is selected, the mobile phone 22 does not make the payment shown in the mail, and ends the processing.

When the button 102b is operated while the screen of Step S82 is displayed and various kinds of settings have not yet been input, the mobile phone 22 displays a screen as illustrated in Step S86. The screen of Step S86 contains a display column 105 in which payment options to be selected are displayed, and buttons 104b and 104c. The display column 105 contains as options: "A. Credit card", "B. Direct deposit", and "C. Payment slip". The option "A. Credit card" is an option of paying the annual fee with a credit card. The option "B. Direct deposit" is an option of paying the annual fee via direct deposit. The option "C. Payment slip" is an option of receiving a payment slip and paying the annual fee by using the payment slip through a relevant institution. The button 104b is the button for inputting an operation to perform the processing selected in the display column 104a. The button 104c is the button for inputting an operation to delete the display in the display column 104a. When the button 104c is selected, the mobile phone 22 ends the processing without completing the payment processing.

When the option "B. Direct deposit" is selected in the display column 104a at Step S86, and the operation of the button 104b is detected, the mobile phone 22 communicates with the call answering center 18 to obtain data, and displays a screen as illustrated in Step S88. The screen illustrated in Step S88 contains an input screen 106a, and buttons 106b and 106c. The input screen 106a is the screen for inputting pass-codes and the like of the bank account, or more specifically, the account number, the personal identification number, and the like. In the input screen 106a, there is provided a blank column for inputting various kinds of information. The button 106b is the button for inputting an operation to perform the processing which has been input through the input screen 106a. The button 106c is the button for inputting an operation to delete the display in the input screen 106a. When the button 106c is selected, the mobile phone 22 ends the processing without completing the payment processing.

When the operation of the button 106b is detected after the necessary information is input at Step S88, the mobile phone 22 communicates with the call answering center 18 to obtain data. The call answering center 18 performs an authenticating processing by transmitting the bank account information to the bank server 34 via the management server 16. Upon completion of the authenticating processing, the various kinds of information about the bank account are sent to the call answering center 18 via the management server 16. The call answering center 18 transmits the acquired information to the mobile phone 22.

Upon acquiring the information transmitted from the call answering center 18, the mobile phone 22 displays an image as illustrated in Step S89. The screen illustrated in Step S89 contains a display column 108a and buttons 108b and 108c. The display column 108a shows the details of the transaction and the details of the debit account. The button 108b is the button for inputting an operation to perform the payment processing which is displayed in the display column 108a. The button 108c is the button for inputting an operation to delete the display in the display column 108a. When the button 108c is selected, the mobile phone 22 ends the processing without completing the payment processing.

When the button 108b is operated while the screen illustrated in Step S89 is being displayed, the mobile phone 22 sends the information about it to the call answering center 18, and completes the payment processing.

As described above, according to the communication system 10, since the advertisers are the authorized parties to collect money, the authorized parties can collect money only by identifying the targets to be sent mails. Furthermore, the authorized parties can confirm the payment status only by monitoring the information which is stored in the call answering center 18. Specifically, the call answering center 18 stores the information about the targets to which the mails are sent, and stores the information about the reply processing to the sent mails. Thereby, it is possible to confirm which user has not paid the money and which user has paid the money. Furthermore, by using the reply program, it is possible for the users to reduce the access frequency or the access effort to the call answering center 18.

The billing items to be paid or collected are preferably membership dues of non-profitable organizations with high public-interests. However, the billing items may be used for settling various fees or payments including electricity charges, gas charges, water and sewage charges, subscription fees of newspapers and magazines, subscription fees of cable televisions and so on. Furthermore, in any case, the users who have to pay the money can select the payment options and can indicate their intentions of paying the money. Thereby, it is possible to collect the money with consensus on the payment.

Figure 15:
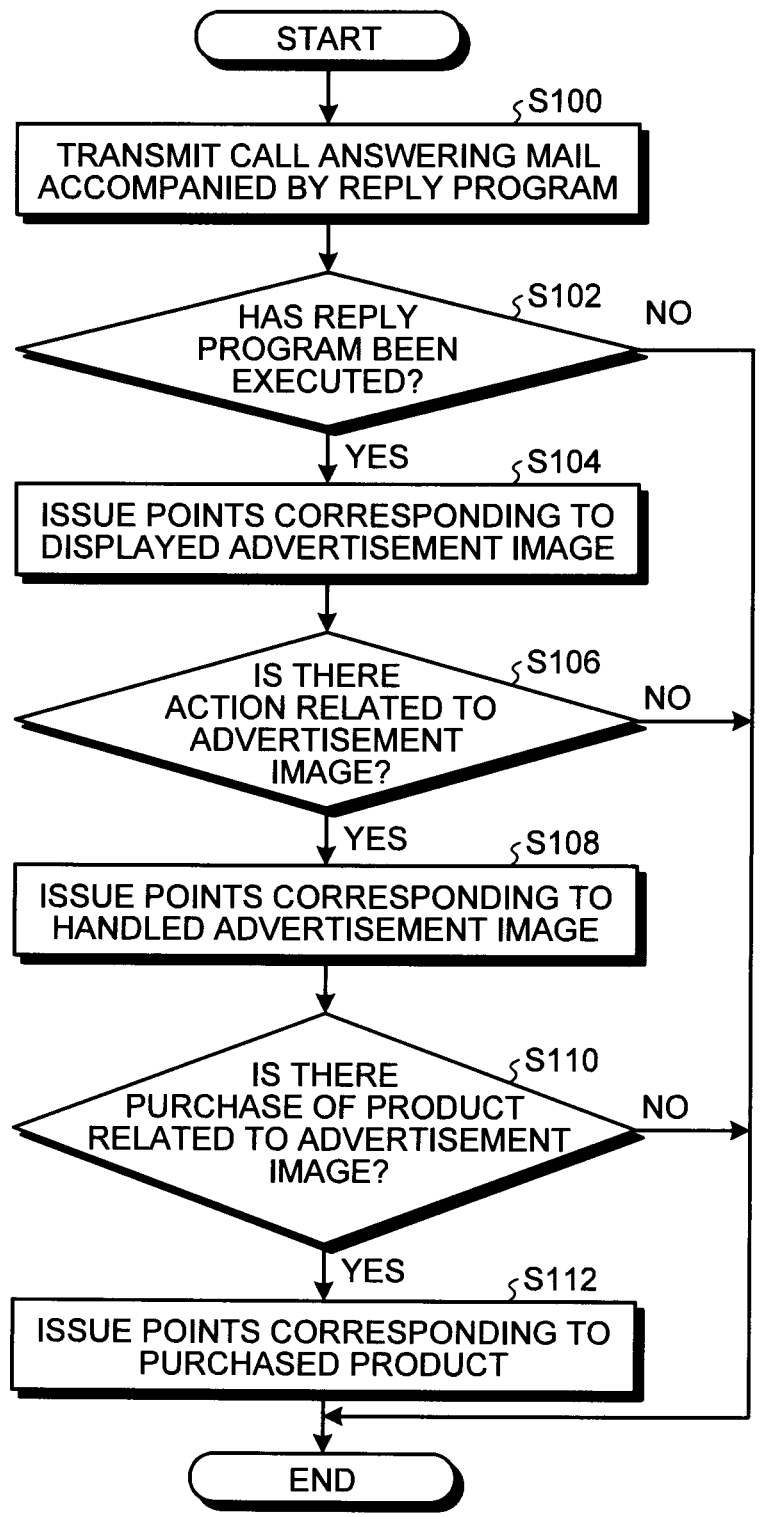
FIG. 15 is a flowchart illustrating an example of processing operations to be performed by a call answering center.

Here, the communication system 10 preferably issues or adds any premium or reward points in response to the processing relating to the reply mail, when the call answering mail attached by the reply program is sent. Incidentally, the target to which the points are issued or added is a mobile phone which performs the call answering settings and missed the incoming call, i.e. the mobile phone on the callee side. FIG. 15 is a flowchart illustrating an example of processing operations to be performed by the call answering center.

Upon transmitting a call answering mail accompanied by the reply program at Step S100, the call answering center 18 determines whether the reply program has been executed at Step S102. If it is determined that the reply program has not been executed at Step S102 (No at Step S102), i.e. it is determined that the advertisement image has not been viewed, the call answering center 18 ends the present processing. If it is determined that the reply program has been executed at Step S102 (Yes at Step S102), the call answering center 18 issues or adds the points corresponding to the displayed advertisement image, at Step S104. Specifically, part of the fee the advertiser has paid for the displaying of the advertisement image is provided as the points.

Upon issuing or adding the points at Step S104, the call answering center 18 determines whether there is an operation related to the advertisement image at Step S106. If it is determined that any operation related to the advertisement image has not been performed at Step S106 (No at Step S106), i.e. it is determined that various kinds of images corresponding to the advertisement image have not been acquired from the call answering center 18, the call answering center 18 ends the present processing. If it is determined that there is an operation related to the advertisement image at Step S106 (Yes at Step S106), the call answering center 18 issues or adds the points corresponding to the operated advertisement image at Step S108. Specifically, part of the fee the advertiser has paid for the displaying of the advertisement image is provided as the points.

Upon issuing or adding the points at Step S108, the call answering center 18 determines whether there is a purchase of a product related to the advertisement image at Step S110. If it is determined that any product related to the advertisement image has not been purchased at Step S110 (No at Step S110), i.e. it is determined that the processing has been ended without the purchase of the product, the call answering center 18 ends the present processing. If it is determined that the product related to the advertisement image has been purchased at Step S110 (Yes at Step S110), the call answering center 18 issues or adds the points corresponding to the purchased product at Step S112. Specifically, part of the fee the seller of the purchased product or the advertiser has paid is provided as the points, and the present processing comes to an end.

Figure 16:
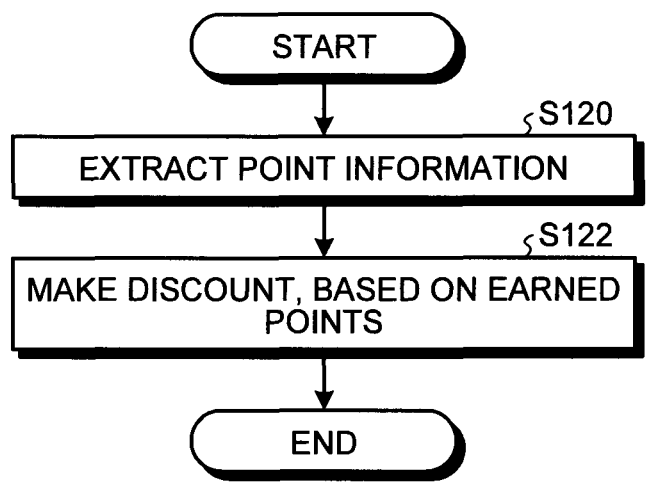
FIG. 16 is a flowchart illustrating an example of processing operations to be performed by a call answering center.

FIG. 16 is a flowchart illustrating an example of processing operations to be performed by the call answering center. Using the points issued or added in the processing illustrated in FIG. 15, the communication system 10 can discount various kinds of payments. The call answering center extracts accumulated point information about a target mobile phone at Step S120, makes a discount based on the earned points at Step S122, and then ends the present processing. In the communication system 10, each user of the call answering function can earn money simply by using the call answering function through the call answering center 18, as described above. Accordingly, the communication system 10 can provide an environment in which the users of the mobile phones readily use the call answering function. The issuance of points, the billing processing, and the discount processing for the price may be conducted by the management server 16.

By offering monetary benefits to the users of the call answering function in the above described manner, the communication system 10 can increase the number of the users of the call answering function. The rate of utilization of the reply program can also be increased. By displaying the telephone number of each user of the call answering function as in the above described embodiment, the targets to which points are to be issued can be made clear. The issuance of points may be allowed only once for each one advertiser and each one user of the mobile phones. The numbers of points to be issued may vary among viewing an advertisement image, viewing a catalog image, requesting product and/or service information materials, purchasing a product, and applying for a service. Specifically, the more contributions are made to the sales of products, the more points may be issued.

Figure 17:
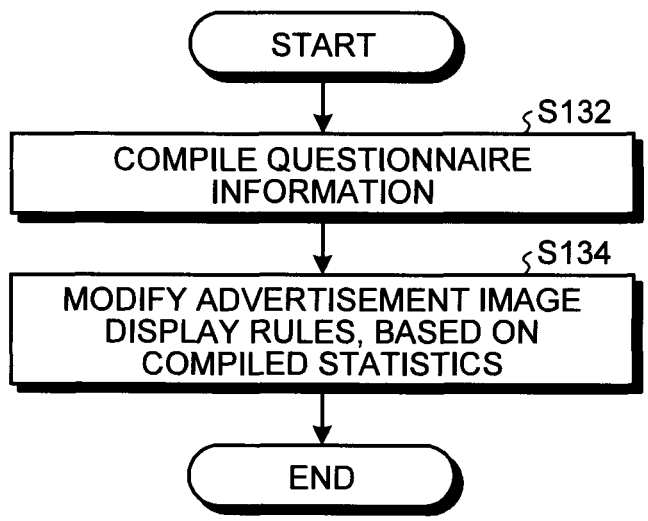
FIG. 17 is a flowchart illustrating an example of processing operations to be performed by a call answering center.

The communication system 10 preferably performs each processing, on the basis of questionnaire survey results acquired by the call answering center. Here, FIG. 17 is a flowchart illustrating an example of processing operations to be performed by the call answering center. The call answering center 18 compiles questionnaire information at Step S132, modifies the advertisement image display rules on the basis of the compiled statistics at Step S134, and then ends the present processing. As illustrated in FIG. 17, by switching advertisement images to be displayed on the basis of questionnaire survey results, the communication system 10 can display advertisement images that will achieve a higher rate of utilization.

Based on the information contained in the personal data or questionnaire survey results, the call answering center 18 may determine the preferences of each user, and select advertisement images to be attached to the reply program.

Incidentally, the call answering center 18 preferably extracts advertisement images to be displayed, so that a different advertisement image appears in each mail. Furthermore, in the communication system 10, the users of the call answering function may be allowed to select and determine advertisement images to be displayed. Thereby, it is possible to display the image according to the user's intention, with reflecting the user's preference. In this case, a plurality of images is preferably displayed for the user. One contractor of the image display contract becomes the contractor for the plurality of images, so that different advertisement images are sent to the contractor, every day or at every incoming call to the mobile phone subscribing the answering service. For example, if the user of one mobile phone becomes a contractor of ten kinds of advertisement images, the ten kinds of advertisement images may be sent in rotation at every incoming call to the mobile phone subscribing the call answering service. Or, the ten kinds of advertisement images are sent in rotation every day over ten days. Thus, it is possible to enhance the advertising effect by sending the advertisement images in various manners.

Furthermore, in the communication system 10, the plurality of advertisement images may be attached to the reply program. Thereby, it is possible to enhance the efficiency of the advertisement. For example, one screen may be divided into two (upper one and lower one), or into three (upper one, middle one, and lower one), so that two or three advertisement images are registered each for these respective divided spaces.

Furthermore, in the communication system 10, it is possible to limit the transmission of the advertisement image to the same telephone number. For example, the transmission of the advertisement image of the same kind when the call answering center receives calls from the same telephone number may be limited to once in 24 hours, once in 48 hours, or only one time. It is possible to reduce the waste economical burden of the advertiser by preventing the same advertisement image from being transmitted to the same telephone number in a short time or a short period.

Furthermore, in the communication system 10, it is preferable to limit the number of the advertising images to be received. For example, through the settings of the call answering center or the settings of the mobile phone, the mobile phone may limit to five or ten the number of the advertising images to be received and stored in the storage unit. Thereby, it is possible to reduce the burden due to the non-viewed advertisement.

Furthermore, in the communication system 10, it is preferable to make an option to reject the receiving of the advertising images. Thereby, it is possible to prevent the advertisement from being sent to the user with whom the advertisement effect can hardly be expected.

Incidentally, as for the communication system 10 and the call answering center 18 according to the aforementioned embodiment, the call answering mail is sent to the mobile phone on the caller side with the reply program to which the advertising image is attached. However, the communication system 10 and the call answering center 18 are not to the aforementioned embodiment. As for the communication system 10 and the call answering center 18, any answering message including the reply program may be sent to the mobile phone 22 by other communication means than the mail. For example, the call answering center 18 may send data to be displayed as a browser screen, or may send data to be displayed as a screen having a link.

Here, the communication system 10 can process and store a larger amount of information in the call answering center 18. In the following, examples of processing to be performed in the communication system 10 will be described. Referring now to FIGS. 18 through 22, an explanation will be made on an example of performing the processing for charging or collecting the information about the purchase done by the user of the mobile phone 22.

Figure 18:
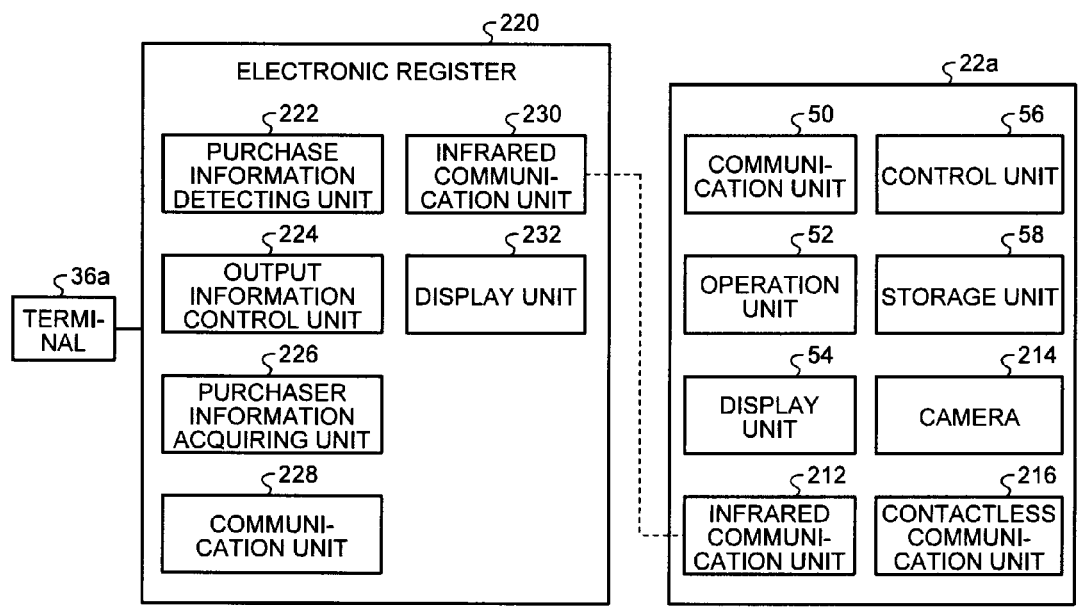
FIG. 18 is a block diagram illustrating an enlarged view of part of the communication system.

FIG. 18 is a block diagram illustrating an enlarged view of part of the communication system. The communication system 10 is an example case where a terminal 36*a* connected to the Internet communication network 14 illustrated in FIG. 18 is a terminal of a retail store. The terminal 36*a* of the retail store includes an electronic register 220 that calculates the prices of products purchased by customers, and performs the payment processing. FIG. 18 also illustrates a mobile phone 22*a* that is capable of exchanging information with the electronic register 220.

The mobile phone 22*a* includes a communication unit 50, an operation unit 52, a display unit 54, a control unit 56, a storage unit 58, an infrared communication unit 212, a camera 214, and a non-contact communication unit 216. The communication unit 50, the operation unit 52, the display unit 54, the control unit 56, and the storage unit 58 are the same as the respective components of the above described mobile phones 22, and therefore, explanation of them is not repeated herein.

The infrared communication unit 212 performs data transmission and reception by using infrared rays. The infrared communication unit 212 can perform data transmission and reception by establishing communication with another infrared communication unit located within a service area. Incidentally, in this embodiment, an explanation is made on the communication by using the infrared rays. However, the mobile phone 22*a* can use a near-field communication unit that performs near field communication, instead of the infrared communication unit. The near-field communication unit may be Bluetooth (a registered trademark) or a wireless LAN, for example. The camera 214 is an imaging device that captures images. The camera 214 captures images of regions within its field of view. The non-contact communication unit 216 is a device that reads information contained in IC tags (RFID). The non-contact communication unit 216 can read information contained in IC tags located within a predetermined area.

The electronic register 220 includes a purchase information detecting unit 222, an output information control unit 224, a purchaser information acquiring unit 226, a communication unit 228, an infrared communication unit 230, and a display unit 232. In addition to those components, the electronic register 220 includes various functions required in an electronic register or a device that processes payments for purchased products, such as a function to issue receipts, an operation panel for manually registering purchased items, a storage unit that stores money, and a control unit that controls operations of the respective components.

The purchase information detecting unit 222 is a device that reads information about products to be purchased. Specifically, the purchase information detecting unit 222 is a bar code reader, an IC tag reader, an operation panel, or the like. As well as the prices of products to be purchased, the purchase information detecting unit 222 acquires the identification information about the products. The output information control unit 224 causes the respective components to perform a processing to process acquired information, a processing to output the processed information, and the like. The purchaser information acquiring unit 226 acquires information about a purchaser who is currently making a purchase. The purchaser information acquiring unit 226 acquires the information about the purchaser, on the basis of an operation that is input to the infrared communication unit 230 or the operation unit.

The communication unit 228 exchanges data with the terminal 36*a*. Like the infrared communication unit 212, the infrared communication unit 230 performs data transmission and reception by using infrared rays. The display unit 232 is a display device that displays images.

Although the electronic register 220 and the terminal 36*a* are devices independent of each other in this embodiment, the embodiment is not limited to that. In the communication system 10, the electronic register 220 may be integrally formed with the terminal 36*a*. In the communication system 10, more than one electronic register 220 may be managed by the single terminal 36*a*.

Figure 19:
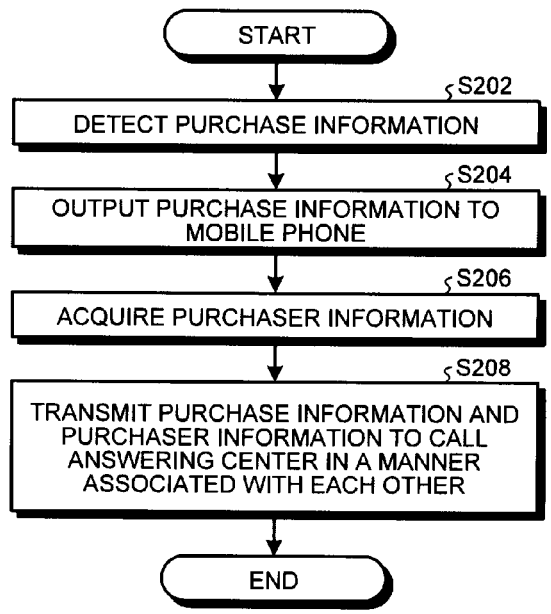
FIG. 19 is a flowchart illustrating an example of processing operations to be performed by an electronic register and a terminal.
Figure 20:
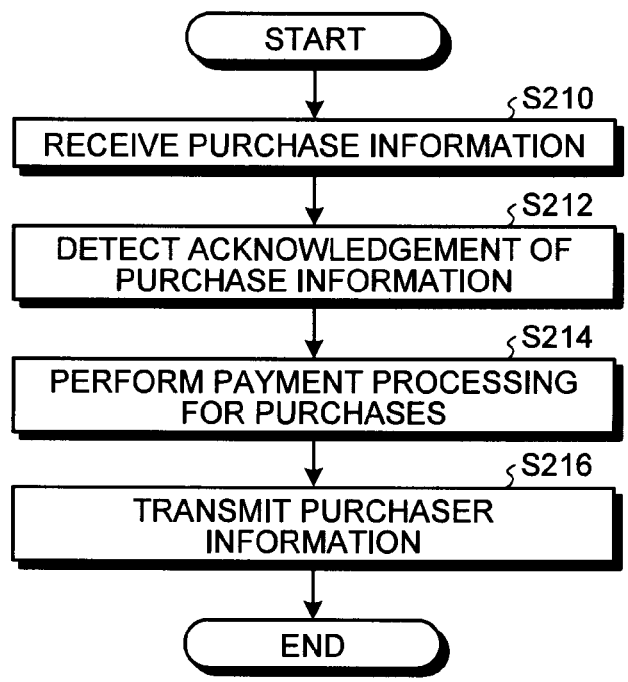
FIG. 20 is a flowchart illustrating an example of processing operations to be performed by a mobile phone.

Referring now to FIGS. 19 and 20, an explanation will be made on a processing to be performed by the electronic register 220 and the mobile phone 22*a* when the owner of the mobile phone 22*a* purchases products at the retail store where the electronic register 220 is installed. FIG. 19 is a flowchart illustrating an example of processing operations to be performed by the electronic register and the terminal.

At Step S202, the electronic register 220 acquires purchase information by using the purchase information detecting unit 222. That is, each product that is sold at the retail store and is to be purchased by the owner is identified, and the information about the products is acquired as the purchase information.

Upon detecting the purchase information at Step S202, the electronic register 220 outputs the purchase information to the mobile phone at Step S204. Specifically, at Step S204, the electronic register 220 establishes communication with the infrared communication unit 212 of the mobile phone 22*a* making the purchases by using the infrared communication unit 230, and sends the purchase information acquired at Step S202 to the mobile phone 22*a*. Here, the purchase information is the information about the product and the quantity thereof which the owner of the mobile phone 22*a* is intending to purchase, or the image or detail information about the product intended to be purchased. The purchase information may also include the information about the manufacturer of the product to be purchased, the information about the retail store selling the intended product (the retail store where the electronic register 220 is installed), and so on. The electronic register 220 may output the purchase information by causing the display unit 232 to display the purchase information or the QR codes (a registered trademark) linked to the purchase information.

Upon outputting the purchase information to the mobile phone at Step S204, the electronic register 220 acquires the purchaser information at Step S206. Specifically, the electronic register 220 establishes communication with the infrared communication unit 212 of the mobile phone 22*a* making the purchases through the infrared communication unit 230, and acquires the information about the purchaser from the mobile phone 22a. Here, the purchaser information is various kinds of information including the telephone number of the mobile phone 22a. The purchaser information may include the personal information stored in the mobile phone 22a, such as the mail address, name, gender, age, and date of birth. The mobile phone 22a can adjust the setting to select the purchaser information to be transmitted. Incidentally, the processing of Steps S204 and S206 may be carried out in parallel, or may be carried out in reverse order. The electronic register 220 processes the payment for the purchases in parallel with the processing of Steps S204 and S206. As the method of payment, a payment function provided in the mobile phone 22a, such as electronic money, may be used, as well as cash and a credit card.

Upon carrying out the processing of Steps S204 and S206, the electronic register 220 associates the purchase information with the purchaser information, and transmits the information to the call answering center 18 at Step S208, and then ends the present processing.

Referring now to FIG. 20, an explanation will be made on a processing to be performed by the mobile phone 22a. FIG. 20 is a flowchart illustrating an example of processing operations to be performed by the mobile phone. FIG. 20 illustrates an example case where the mobile phone 22a also performs the payment processing for purchases. At Step S210, the mobile phone 22a receives the purchase information. Specifically, the mobile phone 22a communicates with the electronic register 220 through the infrared communication unit 212, and receives the purchase information.

Upon receiving the purchase information at Step S210, the mobile phone 22a detects an acknowledging processing of the purchase information at Step S212. Incidentally, the acknowledging processing is a processing to display a screen through which the operation to acknowledge the purchase is input, and thereby detect the operation of the user of the mobile phone 22a to acknowledge the purchase.

Upon performing the acknowledging processing at Step S212, the mobile phone 22a performs the payment processing of the purchase at Step S214. Specifically, on the basis of the acknowledging processing, the mobile phone 22a performs the processing to pay the billing amount based on the purchase information to the electronic register 220 with electronic money. Incidentally, the processing to debit the billing amount from the electronic money may be performed by the electronic register 220.

Upon performing the payment processing at Step S214, the mobile phone 22a transmits the purchaser information to the electronic register 220 at Step S216, and ends the present processing. The mobile phone 22a may not carry out the processing of Steps S212 and S214. For example, when the payment is made in cash, the mobile phone 22a does not carry out the processing of Step S214.

By performing the processing illustrated in FIG. 19 and FIG. 20, the communication system 10 can exchange the information among the terminal 36a, the electronic register 220, and the mobile phone 22a, so that the purchase information and the purchaser information can be transmitted and received. Thereby, in the communication system 10, the terminal 36a can obtain the information about the owner of the mobile phone 22a doing the purchase. It is possible to store the purchase information for each purchaser in the call answering center 18 by transmitting the obtained information from the terminal 36a to the call answering center 18. Furthermore, the terminal 36a can also store the information of the user who purchased the product at the retail shop where the terminal 36a is installed. Furthermore, in the present embodiment, the purchase information and the purchaser information are transmitted from the terminal 36a and the electronic register 220. However, the purchase information and the purchaser information may be transmitted from the mobile phone 22a to the call answering center 18.

Figure 21:
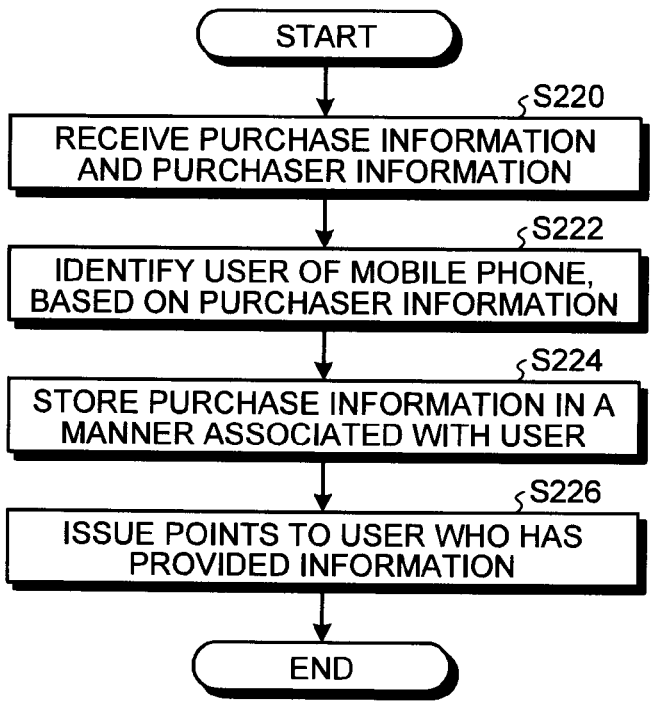
FIG. 21 is a flowchart illustrating an example of processing operations to be performed by a call answering center.
Figure 22:
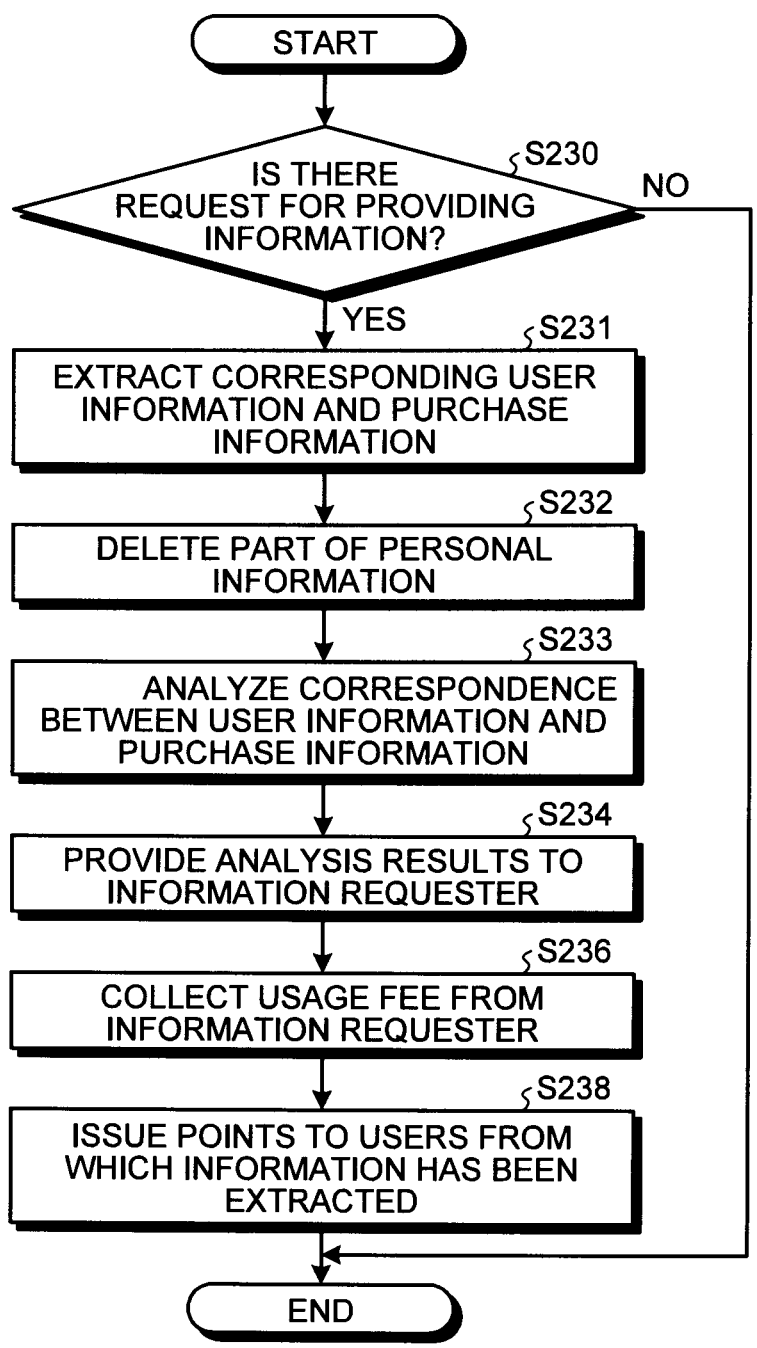
FIG. 22 is a flowchart illustrating an example of processing operations to be performed by a call answering center.

Referring now to FIGS. 21 and 22, an explanation will be made on an example of the processing to be performed relative to the information obtained by the call answering center 18. FIG. 21 is a flowchart illustrating an example of processing operations to be performed by the call answering center.

At Step S220, the call answering center 18 receives the purchase information and the purchaser information transmitted from the terminal 36a. Upon receiving the information at Step S220, the call answering center 18 identifies the user of the mobile phone on the basis of the purchaser information, at Step S222. For example, the call answering center 18 identifies the personal data 44e of the user doing the purchase, by associating the information such as telephone number included in the purchaser information with the personal data 44e in the storage unit 44.

Upon identifying the user who is the purchaser at Step S222, the call answering center 18 stores the purchase information associated with the user, at Step S224. In other words, the call answering center 18 stores the purchase information in the personal data 44e, specifically in an entry for the user of the mobile phone 22 who is the purchaser.

Upon storing the purchase information at Step S224, the call answering center 18 issues points to the user who has provided the information at Step S226. Specifically, the call answering center 18 issues point to the user who is associated with the purchase information. Where necessary, points may be issued also to the terminal (the retail store) that has provided the purchase information and the purchaser information. Upon issuing points, the call answering center 18 ends the present processing.

By issuing points to users who provide the purchase information, the communication system 10 can promote the provision of the purchase information from users. In other words, it is possible to motivate users to provide the information about their mobile phones when doing shopping. Thereby, the communication system 10 can store a larger amount of information about associated relationships between the purchase information and respective users in the call answering center 18.

FIG. 22 is a flowchart illustrating an example of processing operations to be performed by the call answering center. The processing illustrated in FIG. 22 is an example where the call answering center 18 processes the stored purchase information. At Step S230, the call answering center 18 determines whether there is a request for providing information. Providing information is providing a result of an analysis of purchase information. If it is determined that there is no request for providing information at Step S230 (No at Step S230), the call answering center 18 ends the present processing.

If it is determined that there is a request for providing information at Step S230 (Yes at Step S230), the call answering center 18 extracts the corresponding user information and purchase information at Step S231. Specifically, the request for providing information contains conditions for information to be provided, and the combinations of user information and purchase information that satisfy the conditions are extracted. For example, a purchased product, a purchase time, a user's age and gender, and the like can be used as the conditions for extraction.

Upon extracting the information at Step S231, the call answering center 18 deletes part of the personal information at Step S232. The call answering center 18 deletes personal information that does not need to be provided to the external party, from the information contained in the user information. The call answering center 18 deletes name, telephone number, mail address, and the like, and leaves age, gender, utilization area, and the like.

Upon deleting part of the personal information at Step S232, the call answering center 18 analyzes the correspondence between the user information and the purchase information at Step S233. Specifically, statistical processing and the like are performed on the extracted combinations of purchase data and user information.

Upon carrying out the analysis at Step S233, the call answering center 18 provides the analysis results to the information requester at Step S234, collects a fee from the information requester at Step S236, issues points to the users from which the information has been extracted at Step S238, and then ends the present processing.

As described above, in the communication system 10, purchase data and information about a mobile phone are exchanged at the time of each purchase, so that purchase information about each user can be accumulated in the call answering center. Accordingly, the communication system 10 can accumulate detailed personal information and purchase information. As a result, preferences and trends in purchasing behaviors that vary with age, area, and gender can be analyzed in greater detail with higher precision. By providing the analysis results, the communication system 10 can collect the fee for the service. The recipient of the analysis results can acquire more useful sales information, product development information, and marketing research information. As a result, the communication system 10 can provide more points to users, and can reduce financial burdens on the users using the call answering service. The communication system 10 can also prevent each user from being identified, by deleting part of the personal information about each user.

Incidentally, the terminal 36a may output only a gist of purchase information such as information indicating a paid amount shortly after a purchase, and transmit detailed purchase information once a day. In this manner, communication load can be reduced. Furthermore, the electronic register 220 may cause the display unit to display information about points to be issued for providing data, as well as purchase information. In this manner, users can be motivated to provide information.

The mobile phone 22a may acquire information about a purchased product from its own device, and provide the purchase information to the call answering center 18, as described above. In this case, the mobile phone 22a may acquire information about a purchased product by reading a QR code (a registered trademark) with camera, or acquire information about a purchased product by reading the IC tag of the product, other than acquiring purchase information from the electronic register as described above. In this case, furthermore, the read product information is preferable provided with the information to apply the project of the manufacturers (enterprises) of the corresponding products, such as "application guide for a prize or free overseas travel", "application guide for a free gift", or "application guide for a questionnaire". Thereby, it is possible to increase the possibility that respective users read the product information. Furthermore, the product information preferably contains a Ucode, a serial number, a symbol or the like capable of being identified for each product. Thereby, it is possible to prevent the purchase information of one product from being provided more than once, and store the purchase information of the product with higher accuracy.

Figure 23:
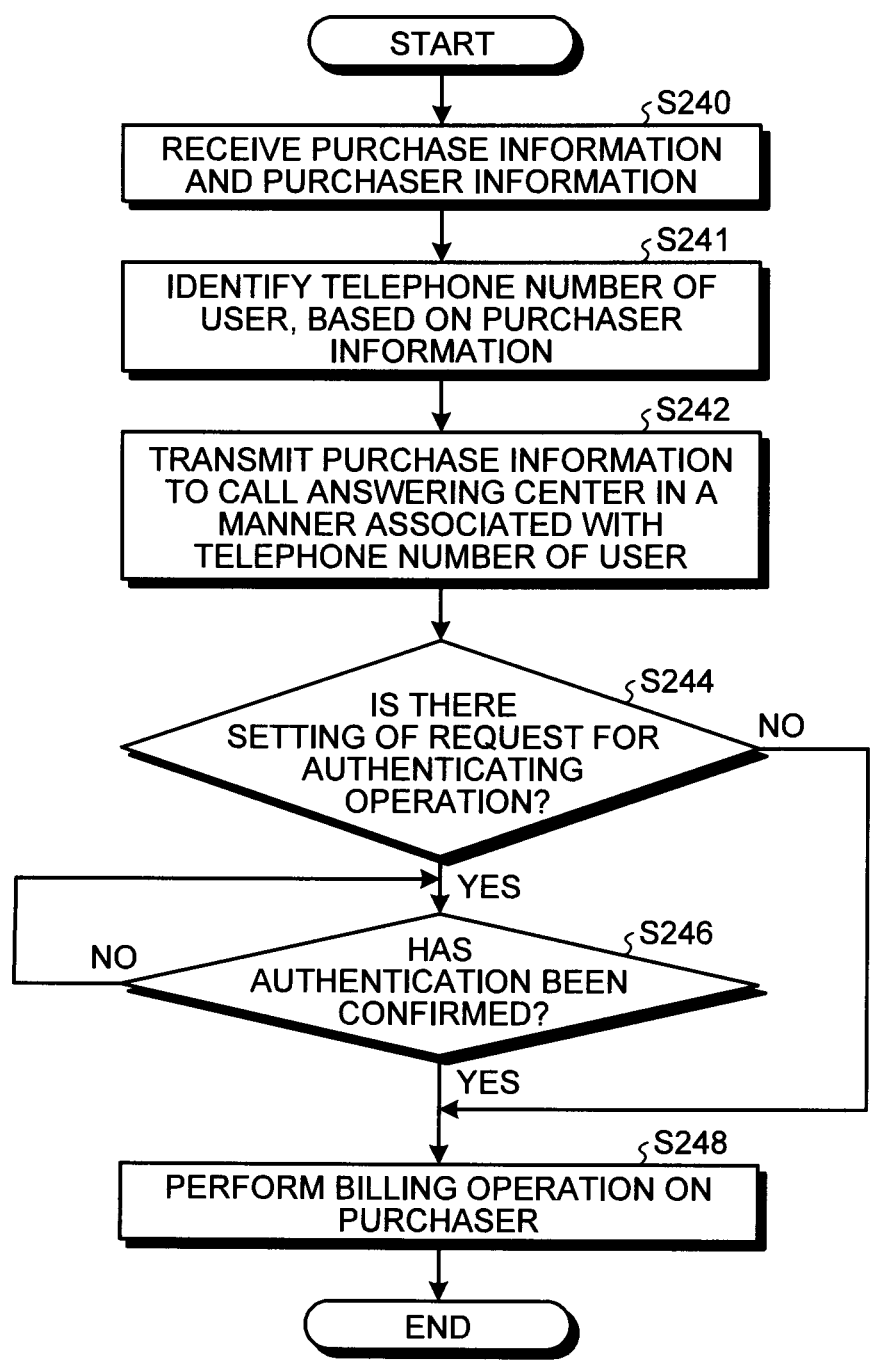
FIG. 23 is a flowchart illustrating an example of processing operations to be performed by a credit card company server.
Figure 24:
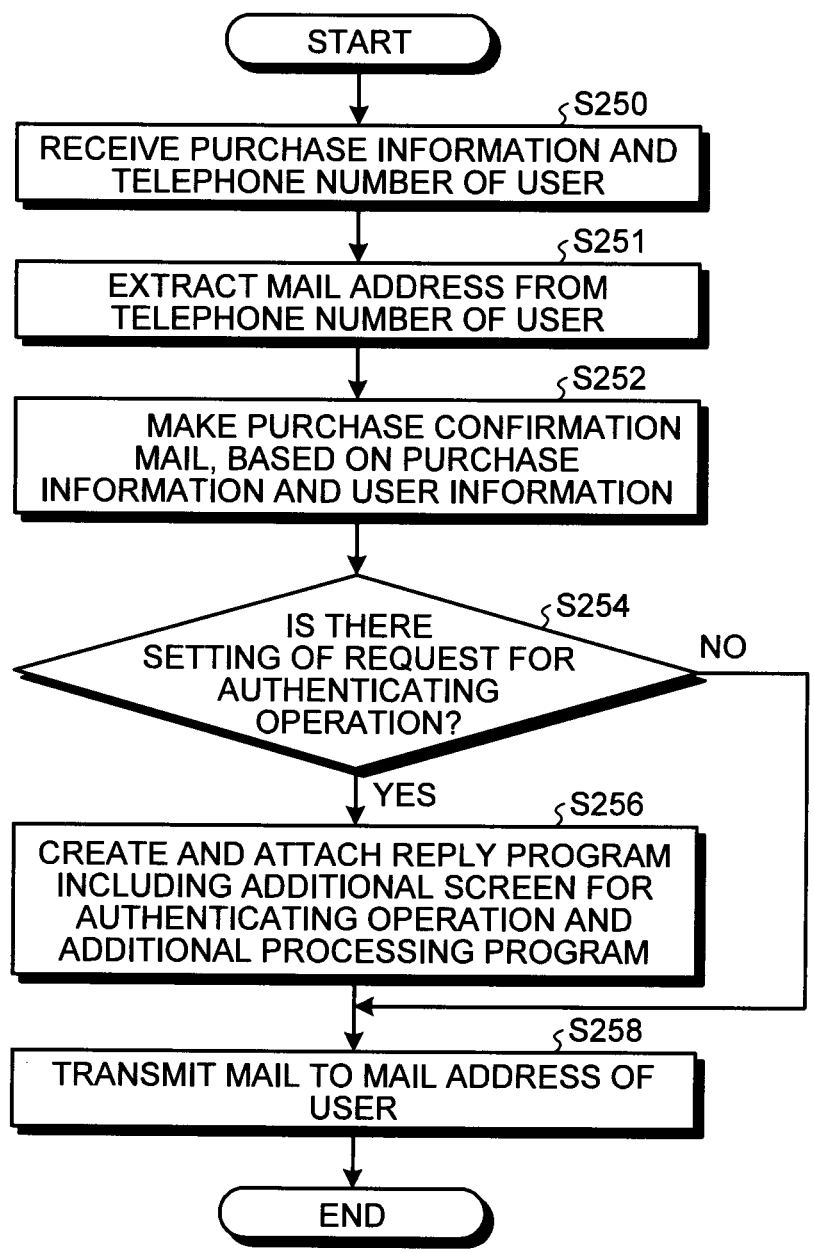
FIG. 24 is a flowchart illustrating an example of processing operations to be performed by a call answering center.

Furthermore, in the communication system 10, when a credit card associated with a mobile phone is used, a mail may be transmitted from the credit card company server to the mobile phone. FIG. 23 is a flowchart illustrating an example of processing operations to be performed by the credit card company server. FIG. 24 is a flowchart illustrating an example of processing operations to be performed by the call answering center.

At Step S240, the credit card company server 32 receives purchase information and purchaser information from the terminal 36 of a retail store or the like. The purchaser information contains the credit card number. Furthermore, the purchase information contains information about the purchased product, as well as the amount to be paid.

Upon receiving the information at Step S240, the credit card company server 32 identifies the telephone number of the user, on the basis of the purchaser information, at Step S241. The credit card company server 32 incorporates the information about the telephone number of the mobile phone, as well as the information about the credit card and the user name, into information about the user. The information about a mail address may also be incorporated.

Upon identifying the telephone number at Step S241, the credit card company server 32 transmits the purchase information associated with the telephone number of the user to the call answering center 18 at Step S242. In other words, the credit card company server 32 identifies the telephone number of the user who has made the purchase, and transmits the combination information of the purchase information and the telephone number to the call answering center 18.

Upon transmitting the data to the call answering center 18 at Step S242, the credit card company server 32 determines whether there is a setting of a request for an authentication processing at Step S244. The setting of the request for the authentication processing is a setting to request the authentication for the processing to purchase the product by using the user's mobile phone. In other words, it is a setting to request the authentication processing by the user's mobile phone with regard to the use of the credit card. If it is determined that there is no setting of a request for an authentication processing at Step S244 (No at Step S244), the credit card company server 32 proceeds to Step S248.

When it is determined that there is a setting of a request for an authentication processing at Step S244 (Yes at Step S244), the credit card company server 32 determines whether the authentication has been confirmed at Step S246. In other words, it is determined whether there is an input of the operation to authenticate from the user's mobile phone, and whether the information of the authentication processing performed by the user's mobile phone has been reached. Incidentally, the authentication processing is transmitted from the mobile phone via the call answering center 18, or transmitted by mail via the management server 16.

If it is determined that authentication has not been confirmed at Step S246 (No at Step S246), the credit card company server 32 again performs the processing of Step S246. If it is determined that authentication has been confirmed at Step S246 (Yes at Step S246), or when the result of the determination is No at Step S244, the credit card company server 32 performs a billing processing on the purchaser at Step S248, and then ends the present processing.

Referring now to FIG. 24, an explanation will be made on a processing to be performed by the call answering center 18. At Step S250, the call answering center 18 receives the purchase information and the telephone number information of the user. In other words, the call answering center 18 receives the data transmitted from the credit card company server 32.

Upon receiving the data at Step S250, the call answering center 18 extracts the mail address from the telephone number of the user at Step S251. In other words, the mail address is identified from the telephone number of the user, on the basis of the information stored in the personal data 44e.

Upon extracting the mail address at Step S251, the call answering center 18 composes a purchase confirmation mail, on the basis of the purchase information and the user information, at Step S252. The purchase confirmation mail is a mail to confirm whether the processing of purchasing the product with using a credit card has been performed. The purchase confirmation mail contains the information about the purchased product, or the information of the credit card to be used.

Upon composing the mail at Step S252, the call answering center 18 determines whether there is a setting of a request for an authentication processing at Step S254. For example, on the basis of the information stored in the personal data 44e, the call answering center 18 determines whether there is a setting of a request for an authentication processing. If it is determined that there is no setting of a request for an authentication processing at Step S254 (No at Step S254), the call answering center 18 proceeds to Step S258.

If it is determined that there is a setting of a request for an authentication processing at Step S254 (Yes at Step S254), the call answering center 18 creates a reply program to which a screen for an authentication processing and a processing program are added, and then attaches the reply program to the mail at Step S256.

If the reply program is attached to the mail at Step S256, or if the result of the determination is determined as No at Step S254, the call answering center 18 transmits the composed mail to the mail address of the user at Step S258, and then ends the present processing.

As described above, in the communication system 10, data is transmitted to the call answering center 18 not only from a mobile phone but also from the credit card company server 32, and a mail accompanied by the reply program can be transmitted from the call answering center 18 to the target mobile phone. When this mail is transmitted, the same effects as those described above can be achieved by attaching an advertisement image to the mail or the reply program as described above.

In the communication system 10, when a credit card is used, the credit card company server 32 transmits the information to the mobile phone by e-mail, so that the user of the mobile phone 22a can check whether the credit card is being properly used. In the communication system 10, a billing processing is performed on the credit card after an acknowledging processing performed by the mobile phone 22a is detected. Accordingly, the risk of unauthorized use of the credit card can be reduced. In the communication system 10, it is possible to terminate quickly the transaction by not performing the authentication processing. For example, it is possible to use a credit card even if the user does not bring the mobile phone. Furthermore, it is possible to find quickly any unauthorized use by sending the confirmation mail.

In the communication system 10, when the credit card company server 32 transmits information about credit card use to the mobile phone by e-mail, the mail is transmitted via the call answering center 18, so that purchase information can be accumulated in the call answering center 18. In this manner, a larger amount of information about the correspondence between users and purchases can be accumulated, and more useful analyses can be conducted.

In the communication system 10, the credit card company server 32 preferably stores more than one telephone number (or more than one mail address) associated with one credit card. Specifically, one credit card is preferably associated with a telephone number or a mail address of a family member, a relative, a guardian, or a third party designated by the user, as well as the telephone number of the mobile phone 22a of the holder of the credit card. In this manner, the communication system 10 can transmit information about the use of the credit card to more than one mobile phone. Furthermore, it is possible to use the credit card more safely by setting a condition that the authentications from a plurality of mobile phones are required.

In the communication system 10, a credit card may be associated with the telephone number and the mail address of the security division of the credit card company, so that the information about the use of the credit card can also be transmitted to the security division of the credit card company. The security division determines, from the usage history of the credit card, whether the use of the credit card is for an unusual amount of money, with unusual frequency, in unusual time zone, or in a place that does not match the location information about the mobile phone, for example. If it is determined that the use of the credit card is unusual, credit card use can be denied.

Thus, according to the communication system 10, it is possible to increase the security of the credit card use, and thereby increase the reliability to the system for storing or accumulating the purchase information and the system for transmitting and receiving mails through the call answering center 18. Consequently, it is possible to obtain the social credibility to the system.

Figure 25:
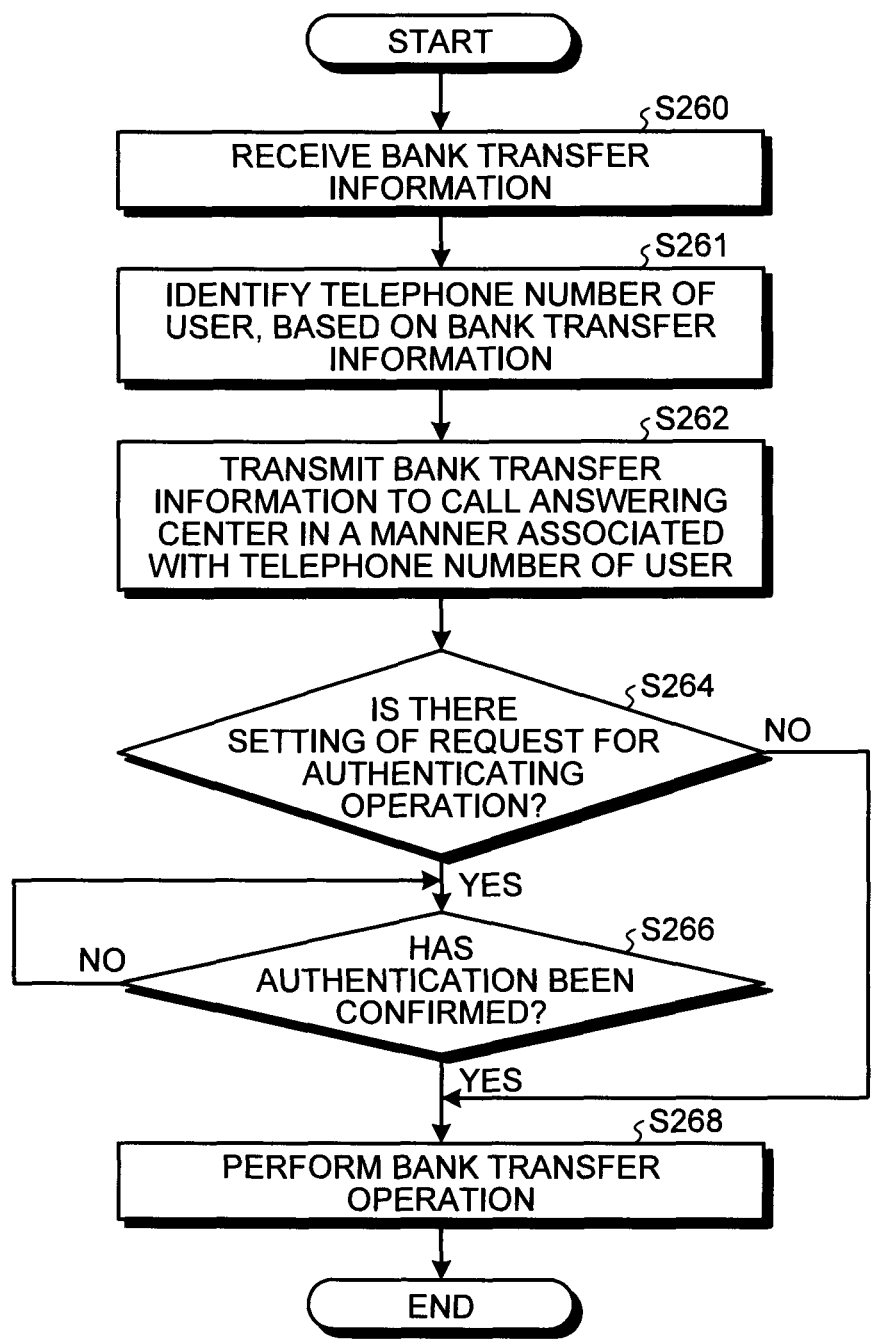
FIG. 25 is a flowchart illustrating an example of processing operations to be performed by a bank server.
Figure 26:
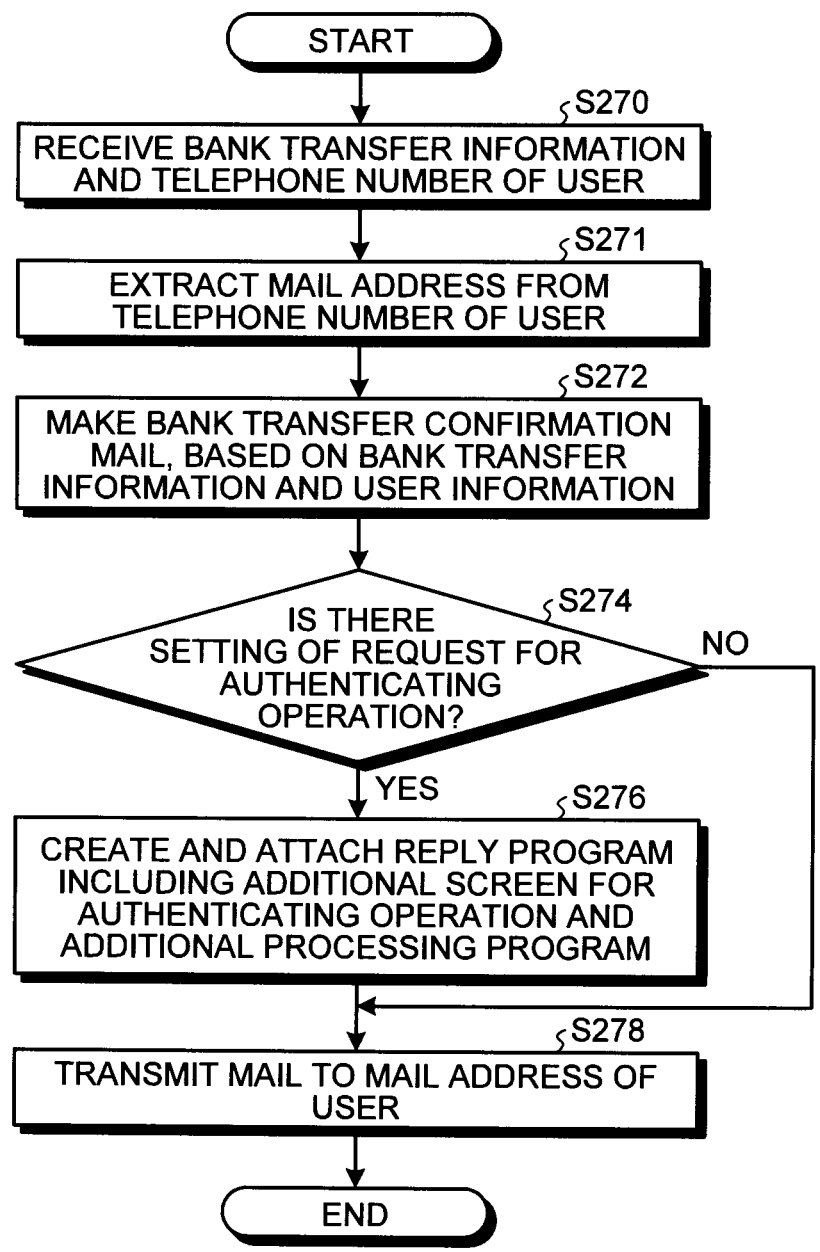
FIG. 26 is a flowchart illustrating an example of processing operations to be performed by a call answering center.

In the communication system 10, when a bank account associated with a mobile phone is used, a mail may be transmitted from the bank server to the mobile phone. FIG. 25 is a flowchart illustrating an example of processing operations to be performed by the bank server. FIG. 26 is a flowchart illustrating an example of processing operations to be performed by the call answering center.

At Step S260, the bank server 34 receives bank transfer information. The bank transfer information contains a bank account number, user information, information about the bank account on the receiving end, and information about the amount of payment.

Upon receiving the information at Step S260, the bank server 34 identifies the telephone number of the user, on the basis of the bank transfer information, at Step S261. The bank server 34 incorporates the information about the telephone number of the mobile phone, as well as the bank account number and the name, into information about the user. The information about a mail address may also be incorporated.

Upon identifying the telephone number at Step S261, the bank server 34 transmits the bank transfer information associated with the telephone number of the user to the call answering center at Step S262. In other words, the bank server 34 identifies the telephone number of the user who has made the purchase, and sends the combination information between the bank transfer information and the telephone number to the call answering center 18.

Upon transmitting the data to the call answering center 18 at Step S262, the bank server 34 determines whether there is a setting of a request for an authentication processing at Step S264. The setting of the request for the authentication processing is a setting to request the authentication for the processing to transfer money by using the user's mobile phone. In other words, it is a setting to request the authentication processing by the user's mobile phone, with regard to the use of the bank account. If it is determined that there is no setting of a request for an authentication processing at Step S264 (No at Step S264), the bank server 34 proceeds to Step S268.

If it is determined that there is a setting of a request for an authentication processing at Step S264 (Yes at Step S264), the bank server 34 determines whether authentication has been confirmed at Step S266. In other words, it is determined whether there is an input of the operation to authenticate from the user's mobile phone, and whether the authentication processing performed by the user's mobile phone has been reached. Incidentally, the authentication processing may be transmitted from the mobile phone via the call answering center 18, or may be transmitted by mail via the management server 16.

If it is determined that authentication has not been confirmed at Step S266 (No at Step S266), the bank server 34 again performs the processing of Step S266. If it is determined that authentication has been confirmed at Step S266 (Yes at Step S266), or if the result of the determination is No at Step S264, the bank server 34 performs a bank transfer processing at Step S268, and then ends the present processing.

Referring now to FIG. 26, an explanation will be made on a processing to be performed by the call answering center 18. At Step S270, the call answering center 18 receives the bank transfer information and the information about the telephone number of the user. That is, the call answering center 18 receives the data transmitted from the bank server 34.

Upon receiving the data at Step S270, the call answering center 18 extracts the mail address from the telephone number of the user at Step S271. In other words, the mail address is identified from the telephone number of the user, on the basis of the information stored in the personal data 44e.

Upon extracting the mail address at Step S271, the call answering center 18 composes a bank transfer confirmation mail, on the basis of the bank transfer information and the user information, at Step S272. The bank transfer confirmation mail is a mail to confirm whether the processing to transfer the money in a bank account to another bank account has been performed. The bank transfer confirmation mail contains the information about the bank account to which the money is transferred, and the information about the amount of money to be transferred and the bank account from which the money is transferred.

Upon composing the mail at Step S272, the call answering center 18 determines whether there is a setting of a request for an authenticating processing at Step S274. For example, on the basis of the information stored in the personal data 44e, the call answering center 18 determines whether there is a setting of a request for an authentication processing. If it is determined that there is no setting of a request for an authenticating processing at Step S274 (No at Step S274), the call answering center 18 proceeds to Step S278.

If it is determined that there is a setting of a request for an authentication processing at Step S274 (Yes at Step S274), the call answering center 18 creates a reply program to which a screen for an authentication processing and a processing program are added, and then attaches the reply program to the mail, at Step S276.

Upon adding the reply program at Step S276, or if the result of the determination is No at Step S274, the call answering center 18 transmits the composed mail to the mail address of the user at Step S278, and then ends the present processing.

As described above, in the communication system 10, data is transmitted from the bank server 34 to the call answering center 18, and a mail accompanied by the reply program can be transmitted from the call answering center 18 to the target mobile phone. When this mail is transmitted, the same effects as those described above can be achieved by attaching an advertisement image to the mail or the reply program as described above.

According to the communication system 10, it is possible for the user of the mobile phone 22a to confirm whether the money in the bank account is used properly, or whether the bank account to which the money is transferred has no trouble, by transmitting the corresponding information by e-mail from the bank server 34 to the mobile phone 22a when performing the bank transfer from the bank account. Furthermore, according to the communication system 10, it is possible to reduce the risk of unauthorized use of deposit money, by performing the bank transfer when it is detected that the authentication processing by the mobile phone 22a has been performed. Furthermore, according to the communication system 10, it is possible to terminate the transaction quickly by not performing the authentication processing. Furthermore, it is possible to find any unauthorized use by sending confirmation mails.

Furthermore, according to the communication system 10, it is possible to store or accumulate the bank transfer information in the call answering center 18, by sending the corresponding information by e-mail from the bank server 34 to the mobile phone via the call answering center 18, when using the bank transfer function. Thereby, it is possible to know the bank transfer for the payment for purchase, or know the amount of money for each transfer or the flow of donated money. Consequently, more useful analysis can be possible.

Here, in the communication system 10, the bank server 34 preferably stores more than one telephone number (or more than one mail address) associated with one bank account. Specifically, one band account is preferably associated with a telephone number or a mail address of a family member, a relative, a guardian, or a third party designated by the user, as well as the telephone number of the mobile phone 22a of the holder of the bank account. In this manner, the communication system 10 can transmit information about a bank transfer processing to more than one mobile phone. With the setting of the need for acknowledgements to be performed by more than one mobile phone, bank transfer processing can be more safely used, and bank transfer scams can be prevented, for example.

Furthermore, in the communication system 10, a bank transfer processing may be associated with the telephone number and the mail address of the security division of the bank, so that the information can also be transmitted to the security division of the bank when a bank transfer is made. The security division determines, from the usage history of the bank account, whether the bank account has been used for an unusual amount of money, with unusual frequency, at unusual time zone, or in a different location from ATMs that are normally used, for example. When it is determined that there is an unusual activity, a bank transfer processing can be rejected.

In this manner, the communication system 10 can increase the security for bank transfer processing. Accordingly, the reliability of the system for mail transmission and reception and the system for accumulating purchase information by using the call answering center 18 can be increased, and the systems can have social credibility.

Figure 27:
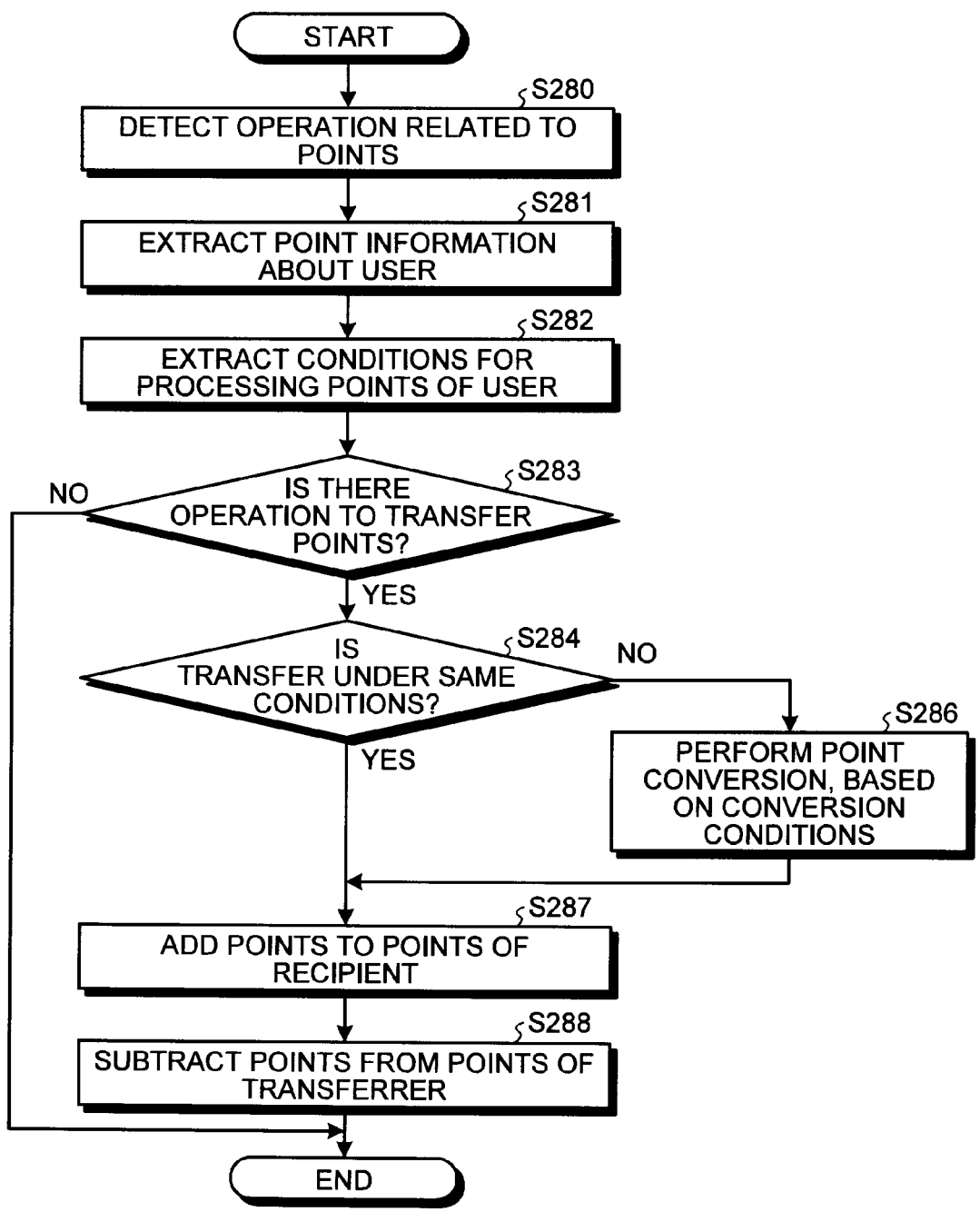
FIG. 27 is a flowchart illustrating an example of processing operations to be performed by a call answering center.

In the communication system 10, it is preferable that the reward or premium points of a user which are accumulated through various kinds of processing can be transferred to another user or the specified eligible person. FIG. 27 is a flowchart illustrating an example of processing operations to be performed by the call answering center.

Upon detecting a processing operation related to the points at Step S280, the call answering center 18 extracts the point information about the user who has input the operation, at Step S281. Upon extracting the point information, the call answering center 18 may provide the point information to the mobile phone of the user. Upon extracting the point information at Step S281, the call answering center 18 extracts the processing condition for the points of the user at Step S282. The processing condition is a way of using points input by the user.

Upon extracting the processing condition at Step S282, the call answering center 18 determines whether there is an operation to transfer points at Step S283. In other words, it is determined whether there is an input of the operation from the user to transfer the points. If it is determined that there is no operation to transfer at Step S283 (No at Step S283), the call answering center 18 ends the present processing.

If it is determined that there is a transfer operation at Step S283 (Yes at Step S283), the call answering center 18 determines whether the transfer is under the same conditions at Step S284. In other words, the call answering center 18 determines whether a destination of the transfer designated by the processing condition uses a same conversion rate of points.

If it is determined that the transfer is not under the same conditions at Step S284 (No at Step S284), the call answering center 18 performs a point conversion on the basis of conversion conditions at Step S286. In other words, points are converted on the basis of the conversion rates. Upon performing the converting processing, the call answering center 18 proceeds to Step S287.

If it is determined that the transfer is under the same conditions at Step S284 (Yes at Step S284), or if the processing of Step S286 is carried out, the call answering center 18 adds the points to the destination of the transfer at Step S287, and subtracts the points from the transferrer at Step S288. In other words, on the basis of the processing condition, the number of points according to the condition is added to the number of points held by the recipient, and an equivalent number of points is subtracted from the number of points held by the transferrer or the user. Upon carrying out the processing of Step S288, the call answering center 18 ends the present processing.

As the communication system 10 allows transfers of accumulated points as illustrated in FIG. 27, the points can be effectively used, and services through the call answering center 18 can be more effectively used. As described above, the points can be earned by various means, such as viewing of an advertisement image, a purchase of a product through an advertisement image, provision of purchase information, and a response to a questionnaire. The destination of the point transfer may be a family member, a relative, a friend, or the like. Furthermore, the destination of the point transfer is not limited to the mobile phone of the specified person. The point transfer may be used for the donation to the non-profitable organizations and the like, or may be applied for the payment of another shopping, or may be applied for telephone bill. Furthermore, in the communication system 10, it is possible to exchange points with points of other services by converting or transforming points.

Figure 28:
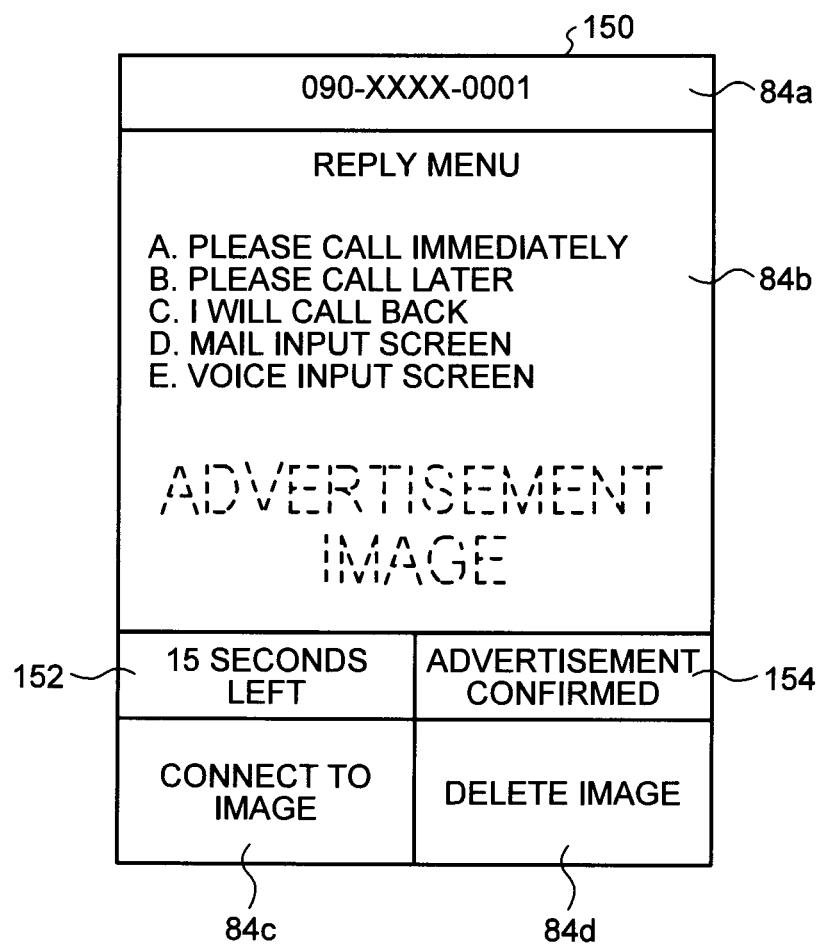
FIG. 28 is a diagram for explaining an example of a screen.

Here, in the communication system 10, the reply program may include a display condition for an advertising image and a function to detect whether the user confirms the advertising image according to the display condition. FIG. 28 is a diagram for explaining an example screen. FIG. 29 is a flowchart illustrating an example of processing operations to be performed by a mobile phone.

A screen 150 illustrated in FIG. 28 contains an item 84a for identifying a callee, an item 84b for selecting a message to be sent to a mobile phone 22 on the receiving end, a button 84c, a button 84d, an item 152, and a button 154. An advertisement image is displayed in the background of the screen 150. That is, in the screen 150, the items 84a, 84b, and 152, and the buttons 84c, 84d, and 154, which are created according to the reply program, are superimposed on the advertisement image. The items 84a and 84b, and the buttons 84c and 84d are the same as those of the above described screen 80a.

The item 152 is an item for displaying the number of seconds obtained by subtracting the number of seconds that has passed since the start of the displaying of the screen 150 from a predetermined number of seconds. The predetermined number of seconds is set for the advertisement image, and has been incorporated into the conditions at the time of generation of the reply program. The predetermined number of seconds is a desired number of seconds to display the advertisement image to be displayed according to the reply program. The button 154 is a button for the user to input a confirmation of the contents of the advertisement.

Referring now to FIG. 29, an explanation will be made on an example of processing operations to be performed by the mobile phone 22 when the screen 150 illustrated in FIG. 28 is to be displayed, or when the screen 150 has been displayed. Here, the mobile phone 22 can realize the processing operations illustrated in FIG. 29, by performing processing on the basis of the reply program and a mounted program. Upon detecting that there is a setting of the number of seconds for displaying image at Step S302, the mobile phone 22 displays the remaining number of seconds on the screen at Step S304. Here, the remaining number of seconds is the number of seconds to be displayed in the aforementioned item 152, and the number of seconds obtained by subtracting the number of seconds that has passed since the start of the displaying of the screen 150 from the predetermined number of seconds. Furthermore, the mobile phone 22 displays the screen 150 containing the item 152.

Upon displaying the remaining number of seconds at Step S304, the mobile phone 22 determines whether a predetermined period of time has passed at Step S306. The predetermined period of time is the time that is set by the above described setting of the number of seconds for displaying image.

If it is determined that the predetermined period of time has not passed at Step S306 (No at Step S306), the mobile phone 22 determines whether the confirmation button has been operated at Step S308. That is, it is determined whether the button 154 has been operated. If it is determined that the confirmation button has been operated at Step S308 (Yes at Step S308), the mobile phone 22 transmits information indicating completion of the advertisement display at Step S310, and ends the present processing. If it is determined that the predetermined period of time has passed at Step S306 (Yes at Step S306), the mobile phone 22 transmits information indicating completion of the advertisement display at Step S310, and ends the present processing. Specifically, the mobile phone 22 transmits the information indicating completion of the advertisement display to the call answering center 18. Upon receiving the information indicating completion of the advertisement display, the call answering center 18 registers information indicating that the advertisement image attached to the reply program has been viewed by the user.

If it is determined that the confirmation button has not been handled at Step S308 (No at Step S308), the mobile phone 22 determines whether there is a display switching processing at Step S312. The display switching processing is a processing to switch the displayed screen from the screen 150 to another screen. If it is determined that there is no display switching processing at Step S312 (No at Step S312), the mobile phone 22 proceeds to Step S304, and repeats the above described processing. If it is determined that there is a display switching processing at Step S312 (Yes at Step S312), the mobile phone 22 transmits information indicating incompletion of the advertisement display, and ends the present processing. Specifically, the mobile phone 22 transmits the information indicating incompletion of the advertisement display to the call answering center 18. Upon receiving the information indicating incompletion of the advertisement display, the call answering center 18 registers information indicating that the advertisement image attached to the reply program has not been viewed by the user (information indicating that the advertisement image was displayed but was deleted before the conditions were satisfied).

According to the communication system 10, since the reply program is provided with a function to perform the confirmation processing of the advertising image, it is possible to transmit from the mobile phone 22 to the call answering center 18 the information indicating whether the user has viewed the advertisement, i.e. the information indicating whether the image display has been continued until the predetermined conditions have been satisfied. Thereby, the communication system 10 can recognize, through the call answering center 18, a situation whether the image is actually viewed, in addition to the information indicating whether the advertisement has been sent. Thereby, the call answering center 18 can recognize a viewing situation of the advertising image more accurately. Furthermore, the call answering center 18 can set or arrange the points so to be provided stepwisely, depending on the viewing situation of the advertising image. For example, it is possible to provide higher points in the case where the display of the advertising image satisfies the conditions, compared to the case where the display of the advertising image does not satisfy the condition.

Furthermore, in the communication system 10, the remaining number of seconds is displayed on a screen according to the reply program, so that the period of time allowed for viewing can be clearly presented to the user.

Here, in the aforementioned embodiment, it is determined that the advertising image has been confirmed, when either one of two display conditions is satisfied: one is when the advertising image has been displayed for a predetermined time period; and one is the user's operation indicating that the advertising image has been confirmed. However, the display conditions are not limited to them. The display condition may be either one of the elapsed time and the user's operation, or may be set to satisfy both the elapsed time and the user's operation. Furthermore, the elapsed time can be freely set by the provider of the advertising image, and the call answering center can incorporate it into the reply program according to the setting of elapsed time. Incidentally, it may be written directly in the program, or may be concluded as a condition in a table to be attached to the reply program.

REFERENCE SIGNS LIST

10 COMMUNICATION SYSTEM
12 TELEPHONE COMMUNICATION NETWORK
14 INTERNET COMMUNICATION NETWORK
16 MANAGEMENT SERVER
18 CALL ANSWERING CENTER
20 BASE STATION
22 MOBILE PHONE
24 FIXED-LINE PHONE
30 ADVERTISER TERMINAL
32 CREDIT CARD COMPANY SERVER
34 BANK SERVER
36 TERMINAL
40, 50 COMMUNICATION UNIT
42, 56 CONTROL UNIT
44, 58 STORAGE UNIT
44a CALL ANSWERING MAIL DATA
44b REPLY PROGRAM DATA
44c ADVERTISEMENT DATA
44d STATISTICAL ANALYSIS DATA
44e PERSONAL DATA
52 OPERATION UNIT
54 DISPLAY UNIT
70 SCREEN
72, 74, 76 INPUT ITEM
77a, 77b BUTTON

The invention claimed is:

1. A communication system comprising:
 a call answering center;
 a first mobile phone configured to register a call answering setting including a setting of a reason for unavailability in the call answering center;
 a second mobile phone configured to make a call to the first mobile phone, the second mobile phone including a display unit and an operation unit; and
 a telephone communication network configured to connect the first mobile phone, the second mobile phone, and the call answering center in a communicable manner,
 wherein, when the second mobile phone makes a call to the first mobile phone, and it is determined that the call answering setting is performed, the call answering center composes a call answering message that includes an absent-reason message indicating the reason for unavailability registered in the call answering setting and that is accompanied by a reply program having an advertisement image attached thereto in accordance with the call answering setting, and the call answering center transmits the call answering message to the second mobile phone,
 wherein upon the second mobile phone receiving the call answering message, the second mobile phone causes the display unit to display simultaneously the absent-reason message indicating the reason for unavailability registered in the call answering setting, an image of the reply program that allows a user of the second mobile phone to choose a to-first-phone-message to a user of the first mobile phone from displayed to-first-phone-messages, and the advertisement image superimposed on the image of the reply program when the operation unit detects an operation to display the reply program file while a message contained in the call answering message is displayed on the display unit, wherein upon the to-first-phone-message being chosen, when the operation unit detects an operation to select the advertisement image, the second mobile phone performs an operation on the basis of the reply program, and causes the display unit to display another image related to the advertisement image, the another image being contained in the reply program, and the second mobile phone transmits the to-first-phone-message to the call answering center, wherein upon receiving the to-first-phone-message from the second mobile phone, the call answering center transmits the to-first-phone-message by e-mail to the first mobile phone, and wherein the to-first-phone-message being chosen is transmitted via the call answering center from the user of the second mobile phone who makes the call to the user of the first mobile phone who is unavailable upon receiving the call.

2. The communication system according to claim 1, wherein, when the operation unit further detects an operation to select an operation related to the advertisement image while the another image related to the advertisement image is displayed, the second mobile phone communicates with the call answering center via the telephone communication network, and acquires information related to the advertisement image.

3. The communication system according to claim 1, wherein the another image contains an image showing an item of an operation associated with the advertisement image.

4. The communication system according to claim 1, wherein the another image contains an image of a questionnaire created by the call answering center.

5. The communication system according to claim 1, wherein, when attachment of the reply program is selected in the call answering setting, the call answering center attaches the reply program accompanied by the advertisement image to the call answering message, and, when attachment of the reply program is not selected in the call answering setting, the call answering center does not attach the reply program to the call answering message.

6. The communication system according to claim 1, further comprising a credit card company server configured to hold information about the first mobile phone and a credit card number associated with the first mobile phone, wherein, when acquiring usage information related to the credit card number, the credit card company server transmits the usage information associated with a telephone number of the first mobile phone to the call answering center, and the call answering center transmits a message containing the usage information to the first mobile phone.

7. The communication system according to claim 6, wherein the call answering center adds a program for executing an acknowledging operation to the message containing the usage information.

8. The communication system according to claim 1, further comprising a bank server configured to hold information about the first mobile phone and a bank account associated with the first mobile phone, wherein, when acquiring information about a bank transfer operation using the bank account, the bank server transmits the information about the bank transfer operation associated with a telephone number of the first mobile phone to the call answering center, and the call answering center transmits a mail containing the information about the bank transfer operation to the first mobile phone.

9. The communication system according to claim 8, wherein the call answering center adds a program for executing an acknowledging operation to the mail containing the information about the bank transfer operation.

10. The communication system according to claim 1, wherein the first mobile phone transmits information about a purchase and information about the device thereof to the call answering center from the device thereof or via another terminal, and the call answering center accumulates the information about the purchase conducted by the first mobile phone.

11. The communication system according to claim 10, wherein the call answering center analyzes a correspondence relationship between accumulated purchase information and personal information about users of mobile phones associated with the purchase information, and outputs an analysis result.

12. The communication system according to claim 1, wherein, on the basis of a viewing status of the advertisement image, the call answering center issues a point to a mobile phone that has set the reply program containing the viewed advertisement image.

13. The communication system according to claim 12, wherein, on the basis of an operation from the mobile phone, the call answering center transfers the point issued to the mobile phone, to another mobile phone.

14. The communication system according to claim 1, wherein the reply program includes conditions for displaying the advertisement image, and a function to detect whether a user has viewed advertisement image in accordance with the conditions for displaying the advertisement image, and, when it is determined that the display of the advertisement image satisfies the display conditions, on the basis of the reply program, the second mobile phone transmits information indicating that the display of the advertisement image satisfies the conditions to the call answering center.

* * * * *